(12) United States Patent
Parmar et al.

(10) Patent No.: US 10,284,902 B2
(45) Date of Patent: May 7, 2019

(54) APPARATUS AND METHOD FOR PLAYING BACK MULTIMEDIA CONTENT

(71) Applicant: Samsung Electronics Co., Ltd., Suwon-si, Gyeonggi-do (KR)

(72) Inventors: Monil Parmar, Noida (IN); Manish Chhabra, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 15/261,362

(22) Filed: Sep. 9, 2016

(65) Prior Publication Data
US 2017/0085942 A1 Mar. 23, 2017

(30) Foreign Application Priority Data

Sep. 18, 2015 (IN) .......................... 2962/DEL/2015
Aug. 19, 2016 (KR) ........................ 10-2016-0105352

(51) Int. Cl.
| | | |
|---|---|---|
| *H04N 5/775* | (2006.01) | |
| *H04N 21/433* | (2011.01) | |
| *H04N 21/431* | (2011.01) | |
| *H04N 21/442* | (2011.01) | |
| *H04N 21/432* | (2011.01) | |
| *H04N 5/76* | (2006.01) | |
| *H04N 9/80* | (2006.01) | |
| *H04N 21/2187* | (2011.01) | |

(52) U.S. Cl.
CPC .......... *H04N 21/4334* (2013.01); *H04N 5/76* (2013.01); *H04N 21/4312* (2013.01); *H04N 21/4316* (2013.01); *H04N 21/4325* (2013.01); *H04N 21/4333* (2013.01); *H04N 21/44218* (2013.01); *H04N 21/2187* (2013.01)

(58) Field of Classification Search
USPC .................................................... 386/46, 239
See application file for complete search history.

(56) References Cited

U.S. PATENT DOCUMENTS

| | | | |
|---|---|---|---|
| 7,502,545 B2 | 3/2009 | Affaki | |
| 7,650,057 B2 * | 1/2010 | Takeshita ................. | H04N 5/76 |
| | | | 386/248 |
| 7,817,898 B2 * | 10/2010 | Senoo .................... | G11B 27/02 |
| | | | 386/224 |
| 8,645,985 B2 | 2/2014 | Deshpande et al. | |
| 2006/0136496 A1 * | 6/2006 | Ohashi ................... | H04N 7/163 |

(Continued)

FOREIGN PATENT DOCUMENTS

EP    2775702 A1    10/2014

OTHER PUBLICATIONS http://www.samsung.com/global/microsite/oledtv/multiview.html.

*Primary Examiner* — Nigar Chowdhury
(74) *Attorney, Agent, or Firm* — Jefferson IP Law, LLP

(57) ABSTRACT

A method of operating an electronic device is provided. The method includes displaying a multimedia content for a plurality of users, detecting non-viewing of the multimedia content displayed on a screen by a first user among the plurality of users, recording a first part of the displayed multimedia content according to the detection, detecting a start of viewing of multimedia content displayed on the screen by the first user, and displaying the multimedia content for the plurality of users and the first part of the multimedia content.

20 Claims, 22 Drawing Sheets

(56) References Cited

U.S. PATENT DOCUMENTS

| | | | |
|---|---|---|---|
| 2007/0033607 A1* | 2/2007 | Bryan | H04H 60/27 |
| | | | 725/10 |
| 2009/0285545 A1 | 11/2009 | Bon | |
| 2013/0135198 A1 | 5/2013 | Hodge et al. | |
| 2015/0195494 A1* | 7/2015 | Alvarez | H04N 7/183 |
| | | | 348/143 |
| 2016/0249092 A1* | 8/2016 | Hasek, IV | H04N 21/4334 |

* cited by examiner

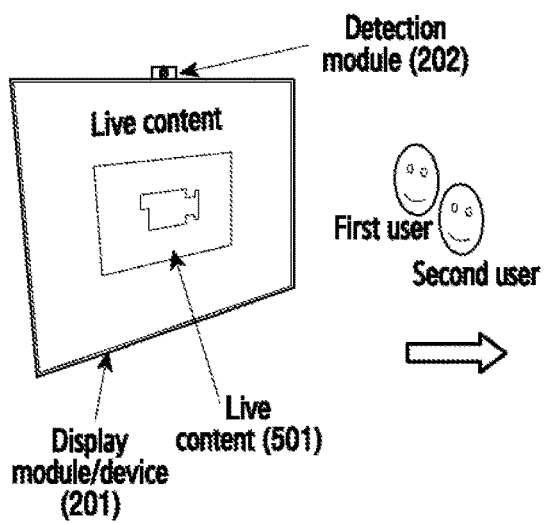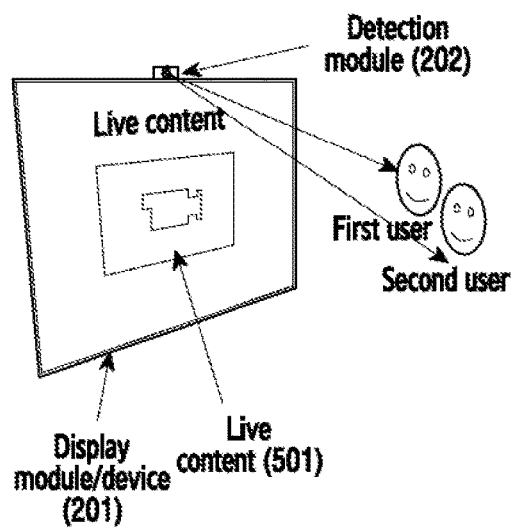
FIG.5A  FIG.5B
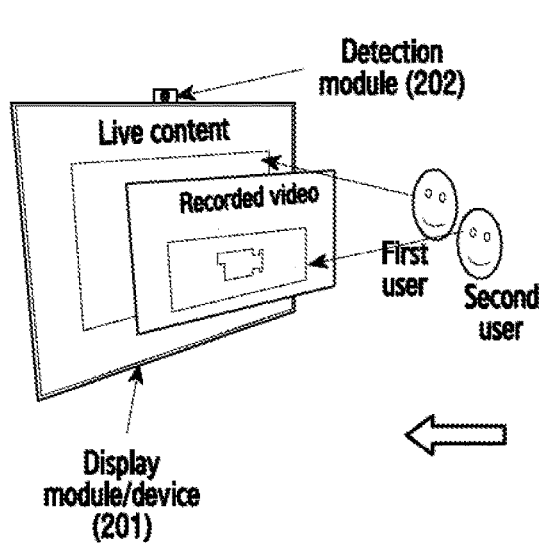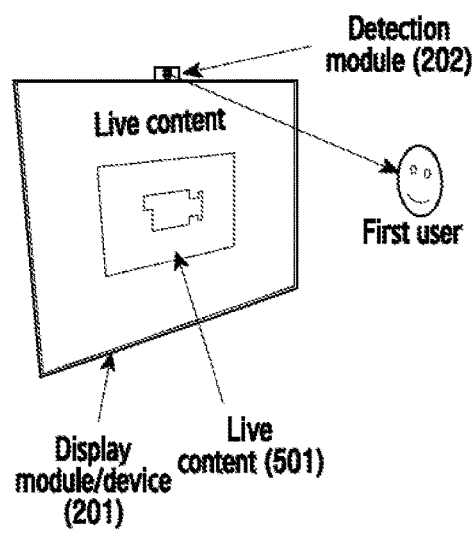
FIG.5D  FIG.5C

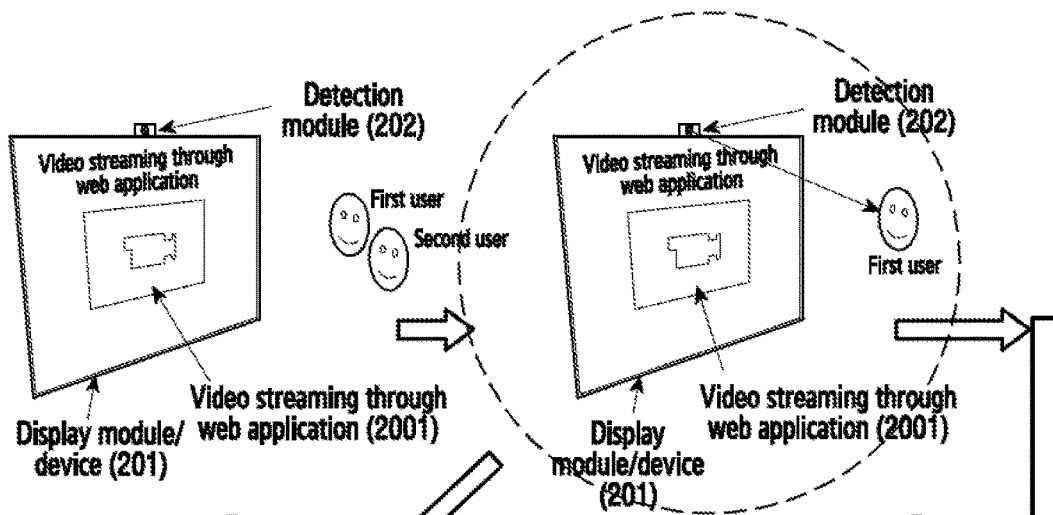
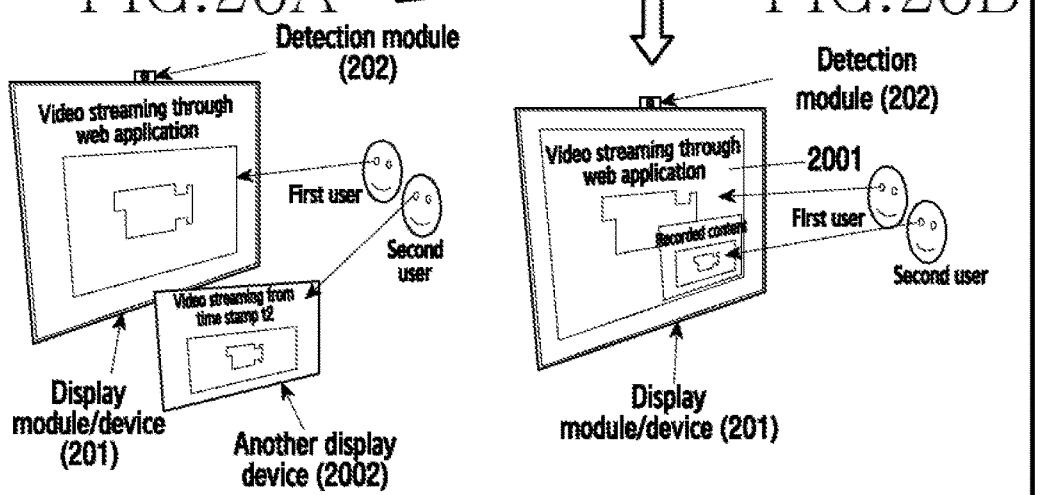
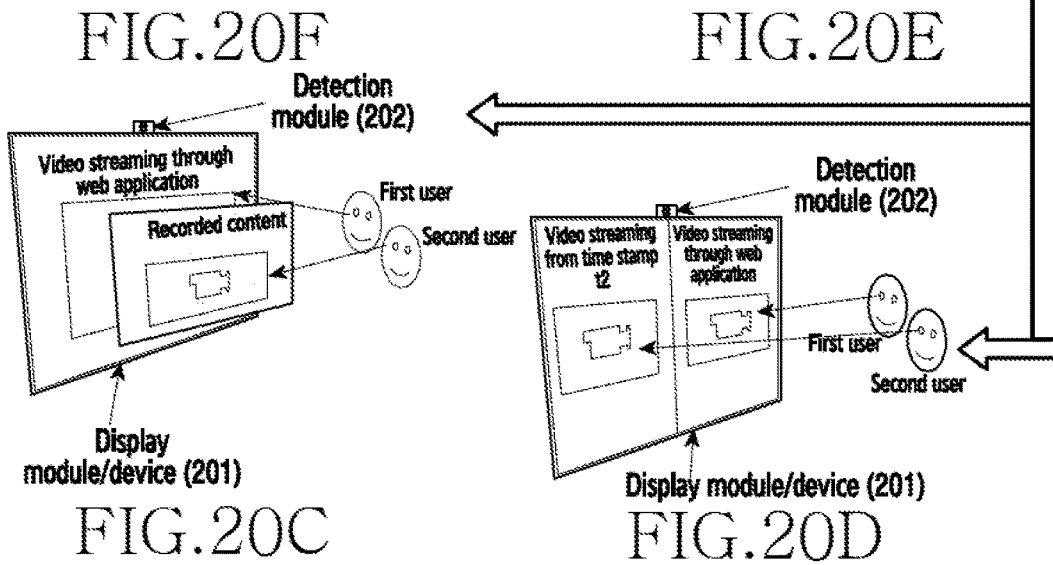

APPARATUS AND METHOD FOR PLAYING BACK MULTIMEDIA CONTENT

CROSS-REFERENCE TO RELATED APPLICATION(S)

This application claims the benefit under 35 U.S.C. § 119(a) of an Indian patent application filed on Sep. 18, 2015 in the Indian Patent Office and assigned Serial No. 2962/DEL/2015, and of a Korean patent application filed on Aug. 19, 2016 in the Korean Intellectual Property Office and assigned Serial No. 10-2016-0105352, the entire disclosure of each of which is hereby incorporated by reference.

TECHNICAL FIELD

The present disclosure relates to a multimedia content. More particularly, the present disclosure relates to an apparatus and a method for playing back a multimedia content.

BACKGROUND

Various devices may be used to play a multimedia content. Various devices provide a variety of features for convenient interaction with users. One of the features which can be used in devices is a playback option. The playback option means playing back a stopped multimedia content. In some examples, stopping a played multimedia content and playing back the stopped multimedia content are based on a specific user instruction. In other examples, while playing the multimedia content is based on the specific user instruction, stopping the played multimedia content is automatically executed and is based on particular conditions.

In general, a method of playing back a multimedia content based on a user instruction of a single user or a method of automatically playing back a multimedia content is used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for playing back a multimedia content.

Another aspect of the present disclosure is to provide an apparatus and a method for playing back a multimedia content which a plurality of users view.

Another aspect of the present disclosure is to provide an apparatus and a method for playing back a multimedia content through a time stamp.

In accordance with an aspect of the present disclosure, a method of operating an electronic device is provided. The method includes displaying a multimedia content for a plurality of users, detecting non-viewing of the multimedia content displayed on a screen by a first user among the plurality of users, recording a first part of the displayed multimedia content according to the detection, detecting a start of viewing of multimedia content displayed on the screen by the first user, and displaying the multimedia content for the plurality of users and the first part of the multimedia content.

In accordance with another aspect of the present disclosure, an electronic device is provided. The electronic device includes a display configured to display a multimedia content for a plurality of users, a sensor configured to detect non-viewing of the multimedia content displayed on a screen by a first user among the plurality of users, and a memory configured to record a first part of the displayed multimedia content according to the detection. The sensor may detect a start of viewing of multimedia content displayed on the screen by the first user, and the display may display the multimedia content for the plurality of users and the first part of the multimedia content.

An apparatus and a method according to various embodiments of the present disclosure can play back a multimedia content for multiple users.

Effects which can be acquired by the present disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, 5C, and 5D illustrate examples of an auto recording and a playback of a live content in a multi-view mode according to various embodiments of the present disclosure;

FIGS. 20A, 20B, 20C, 20D, 20E, and 20F illustrate examples of displaying a content starting from a stored time stamp according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

The present disclosure relates to an apparatus and a method for playing back a multimedia content. Playing back the multimedia content may refer to playing a recorded multimedia content.

The terms indicating display modes (for example, a presentation mode, a full screen mode, a picture-in-picture (PIP) mode, a split screen mode, a multi-view mode, a highlight mode, a trick play mode, and an augmented mode), the terms indicating multimedia contents (for example, a live content and a streaming content), and the terms indicating components within an electronic device are for the convenience of the description. Accordingly, the present disclosure is not limited to the following terms and other terms having the equivalent technical meaning may be applied to the present disclosure.

Figure 1:
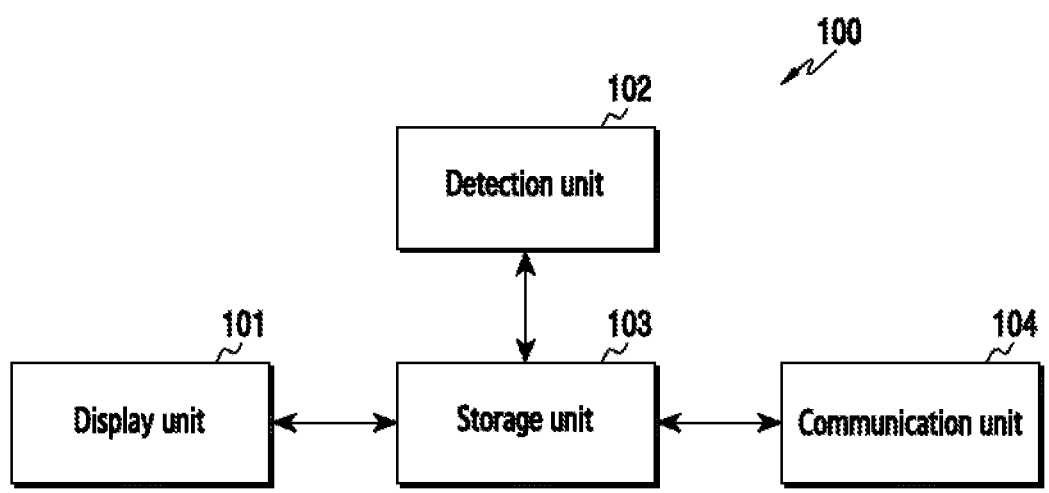
FIG. 1 illustrates an example of a functional configuration of an electronic device according to various embodiments of the present disclosure.

FIG. 1 illustrates an example of a functional configuration of an electronic device according to various embodiments of the present disclosure.

Referring to FIG. 1, the electronic device 100 includes a display unit 101, a detection unit 102, a storage unit 103, and a communication unit 104. According to various embodiments of the present disclosure, the electronic device 100 may be implemented to include fewer or more elements when compared to the elements of FIG. 1 since the elements of FIG. 1 are not essential.

The display unit 101 displays a multimedia content processed by the electronic device 100. That is, the display unit 101 displays a visual output to the user. The visual output may be shown in the form of text, graphics, video, and a combination thereof. According to an embodiment, the display unit 101 displays a format of a part of the recorded multimedia content to one of a plurality of users who start viewing the multimedia content. For example, the format may correspond to a played multimedia content, a highlight of the multimedia content, a summary of the multimedia content, a playback of a part of the recorded multimedia content, or a fast playback of the played multimedia content. The display unit 101 may use various displays. For example, the display unit 101 may use, but is not limited to using, a liquid crystal display (LCD), a light emitting diode (LED), a light emitting polymer display (LPD), an organic LED (OLED), an active matrix OLED (AMOLED), or a flexible LED (FLED).

The detection unit (i.e., sensor) 102 detects the presence/absence of a user(s) or a gaze direction of the user(s).

According to an embodiment, when the user exists within an image generated by photographing a surrounding environment of the electronic device 100, the detection unit 102 detects the presence of the user. When the user does not exist within the image generated by photographing the surrounding environment of the electronic device 100 at regular period intervals, the detection unit 102 detects the absence of the user. According to another embodiment, the detection unit 102 photographs a user's eyes, detects a user's pupils in the photographed image, detects a user's gaze based on locations of the detected user's pupils, and detects a user's gaze movement or gaze path by successively performing such a gaze detection operation.

The storage unit (i.e., memory) 103 may store one or more programs executed by the electronic device 100 and may perform a function for temporarily storing input/output data. For example, the input/output data may include dynamic images, images, photos, audio files, or multimedia contents. The storage unit 103 serves to store a multimedia content, and may store a multimedia content that is acquired in real time in a temporary storage device and store a multimedia content of which storage is fixed in a storage device for long-term storage.

The communication unit (i.e., transceiver) 104 performs wireless communication with another external electronic device to make the multimedia content recorded in the electronic device 100 be displayed in the other external electronic device. That is, the communication unit 104 transmits an instruction or data received from other element(s) of the electronic device 100 to the other external electronic device. According to various embodiments, the communication unit 104 may include a module (for example, short-range communication module or long-range communication module) for performing wireless communication with a neighboring external electronic device. For example, the communication unit 104 may include a mobile communication module, a wireless local area network (WLAN) module, a short range communication module, and a location calculation module.

For example, the electronic device 100 may be one of a multimedia playback device, a handheld device, and a user input device. For example, the multimedia playback device, the handheld device, and the user input device may be one of a television, smart phone, smart glass, tablet, display device, and set-top box.

Figure 2:
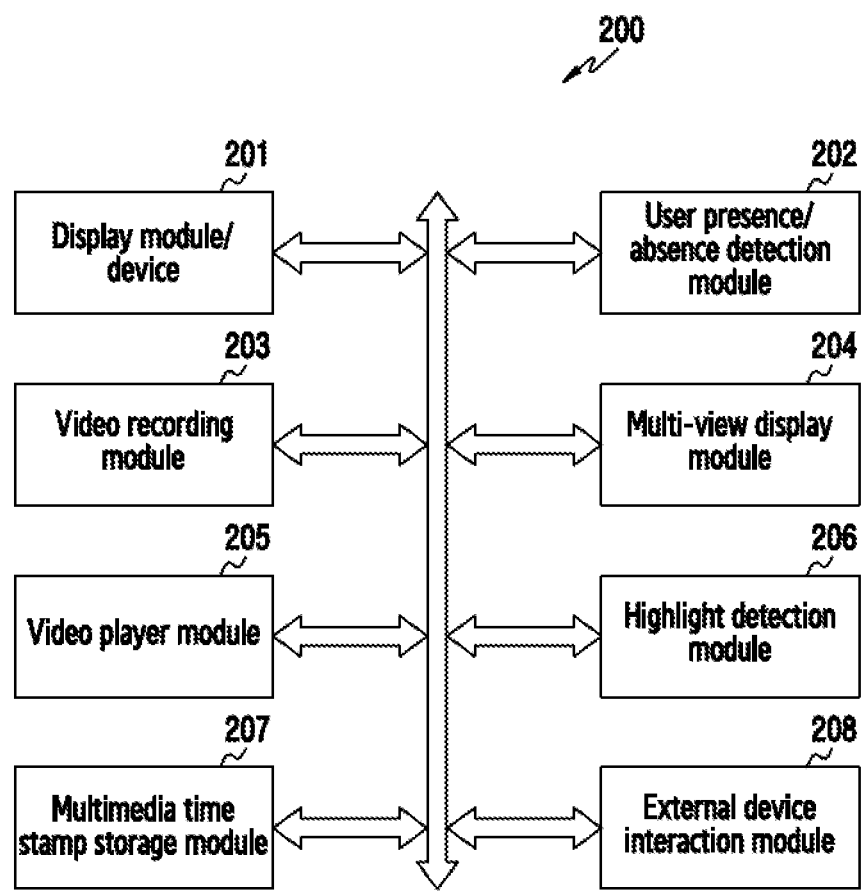
FIG. 2 illustrates an example of a functional configuration of an electronic device for playing back a multimedia content for a plurality of users according to various embodiments of the present disclosure.

FIG. 2 illustrates an example of a functional configuration of an electronic device for playing back a multimedia content for a plurality of users according to various embodiments of the present disclosure.

Referring to FIG. 2, the electronic device 200 includes a display module/device 201, a detection module 202, a video recording module 203, a multi-view display module 204, a video player module 205, a highlight detection module 206, a multimedia time stamp storage module 207, and an external device interaction module 208.

The display module/device 201 displays the multimedia content for a plurality of users. The multimedia content may be a content that is pre-stored in the electronic device 200, or may be a streamed content.

The detection module 202 detects a condition related to non-viewing of the multimedia content by one of the plurality of users. According to an embodiment, the detection module 202 detects the absence of one of the plurality of users or detects that one user's gaze does not face the electronic device 200. Further, the detection module 202 detects a condition related to a start of viewing of the multimedia content by one user. According to an embodiment, the detection module 202 detects the presence of one user or the user's gaze facing the electronic device 200.

The video recording module 203 records a part of the displayed multimedia content. According to an embodiment, the video recording module 203 records the displayed multimedia module from a time point when the condition related to non-viewing of the multimedia content by one of the plurality of users is detected.

The multi-view display module 204 provides a multimedia content for a plurality of users and a format of a part of the recorded multimedia content corresponding to a first user who starts viewing the multimedia content in a presentation mode. The presentation mode refers to a type of mode for displaying a content. For example, the presentation mode may correspond to a full screen mode, a PIP mode, a split screen mode, a multi-view mode, or an augmented mode. The full screen mode corresponds to displaying a multimedia content on a full screen. The PIP mode corresponds to displaying a multimedia content on a full screen and displaying another multimedia content on another screen within the screen simultaneously. The split screen mode corresponds to displaying different multimedia contents on divided two screens, respectively. The multi-view mode corresponds to a plurality of users viewing different multimedia contents displayed on the same screen. The augmented mode corresponds to a plurality of users viewing different multimedia contents in the same virtual reality.

The video player module 205 plays a part of the recorded multimedia content. The video player module 205 fast plays back or plays back the part of the recorded multimedia content. The fast playback corresponds to fast playing the recorded multimedia content.

The highlight detection module 206 detects highlights within the part of the recorded multimedia content. According to an embodiment, the highlight detection module 206 may detect a highlight while the part of the recorded multimedia content is recorded or the part of the recorded multimedia content is played. The highlight may be determined based on a reaction of the user (for example, laughing) viewing the multimedia content. According to another embodiment, the highlight may be determined by detecting a special effect in the multimedia content (for example, detecting shouting when a goal is scored in a soccer game). Further, the highlight detection module 206 detects a format of the highlight for the part of the recorded multimedia content or a summary for the part of the recorded multimedia content while the part of the recorded multimedia content is played. When there is no time to display the entire recorded multimedia content, the summary corresponds to displaying only an important part of the recorded multimedia content.

The multimedia time stamp storage module 207 stores time stamp information of the part of the multimedia content corresponding to the condition related to non-viewing of the multimedia content by one of the plurality of users. The time stamp information includes information on a time point when the condition related to non-viewing of the multimedia content by one of the plurality of users is detected. The multimedia time stamp storage module 207 may further store other time stamp information of another part of the multimedia content corresponding to the condition related to non-viewing of the multimedia content by one of the plurality of users.

The external device interaction module 208 allows the part of the recorded multimedia content to be displayed in another electronic device. According to an embodiment, the external device interaction module 208 transmits information on the recorded multimedia content to the other electronic device.

According to an embodiment, all components of the system, such as the detection module 202, the video recording module 203, the multi-view display module 204, the video player module 205, the highlight detection module 206, the multimedia time stamp storage module 207, and the external device interaction module 208, may be integrated to form a single entity.

According to another embodiment, the display module/device 201 may include the detection module 202, the video recording module 203, the multi-view display module 204, the video player module 205, the highlight detection module 206, the multimedia time stamp storage module 207, and the external device interaction module 208.

Figure 3:
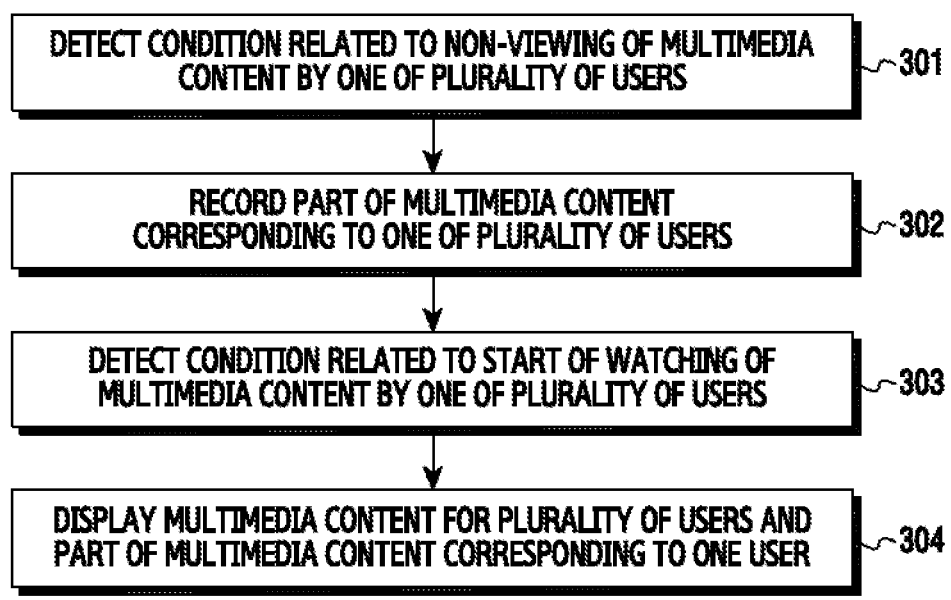
FIG. 3 illustrates an example of a flowchart for a playback of a multimedia content for a plurality of users according to various embodiments of the present disclosure.

FIG. 3 illustrates an example of a flowchart for a playback of a multimedia content for a plurality of users according to various embodiments of the present disclosure.

Referring to FIG. 3, in operation 301, the electronic device 100 detects a condition related to non-viewing of a multimedia content by one of a plurality of users. According to an embodiment, a sensor installed in the electronic device 100 may detect the condition related to non-viewing of the multimedia content by one of the plurality of users. For example, the sensor may be one of a camera, a proximity detector, a presence detector, and a fingerprint detector. According to another embodiment, the electronic device 100 may detect the condition related to non-viewing of the multimedia content by another user of the plurality of users.

In operation 302, the electronic device 100 records a part of the multimedia content corresponding to one of the plurality of users. According to an embodiment, the electronic device 100 may record the entire displayed multimedia content. According to another embodiment, the electronic device 100 may record another part of the multimedia content corresponding to another user of the plurality of users.

In operation 303, the electronic device 100 detects a condition related to a start of watching of the multimedia content by one of the plurality of users. For example, the electronic device 100 detects one of the plurality of users existing within a detection area of the electronic device 100. In another example, the electronic device 100 detects one user's gaze facing the electronic device among the plurality of users. According to an embodiment, the electronic device 100 detects the condition related to a start of watching of the multimedia content by another user of the plurality of users.

In operation 304, the electronic device 100 displays a multimedia content for the plurality of users and a part of a multimedia content corresponding to one user. According to an embodiment, the electronic device 100 simultaneously displays a format of the part of the recorded multimedia content corresponding to one of the plurality of users and the multimedia content for the plurality of users in the presentation mode. For example, the format may be at least one of a highlight of the recorded part, a playback of the recorded part, a summary of the recorded part, and a fast playback of the recorded part. According to another embodiment, the electronic device 100 simultaneously displays the format of the part of the recorded multimedia content corresponding to one of the plurality of users and the multimedia content for the plurality of users in one of the full screen mode, the PIP mode, the split screen mode, the multi-view mode, and the augmented mode. For example, the multimedia content may be one of a broadcasted content, a streamed content, and a content pre-stored in the electronic device 100. According to another embodiment, the electronic device 100 simultaneously displays a format of another part of the recorded multimedia content corresponding to another user of the plurality of users and the multimedia content for the plurality of users in the presentation mode.

Figure 4:
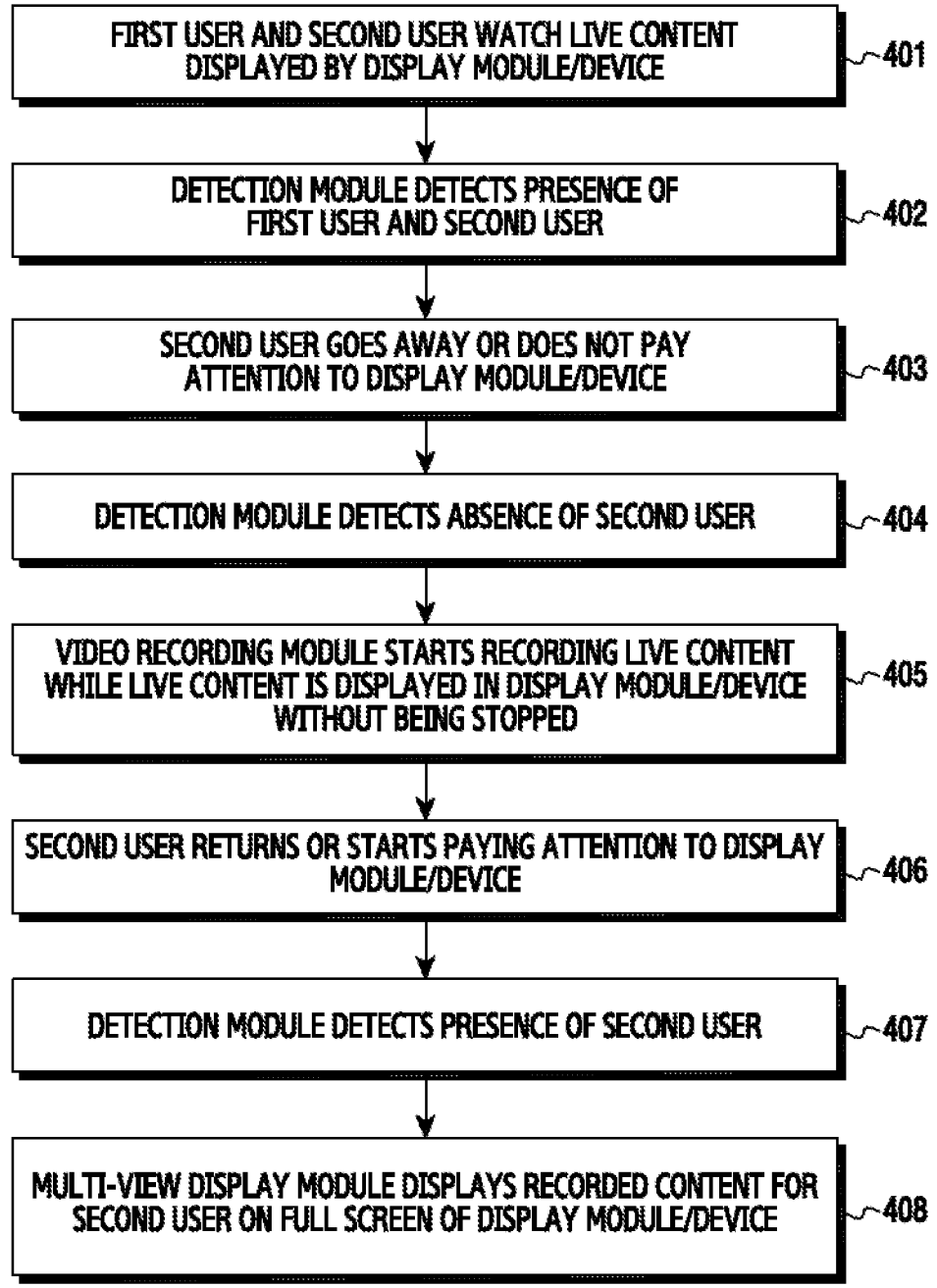
FIG. 4 illustrates an example of a flowchart for an auto recording and a playback of a live content in a multi-view mode according to various embodiments of the present disclosure.

FIG. 4 illustrates an example of a flowchart for an auto recording and a playback of a live content in a multi-view mode according to various embodiments of the present disclosure. Operations of various modules included in the electronic device described in FIG. 4 may be performed by the electronic device 200.

Referring to FIG. 4, in operation 401, a first user and a second user watch a live content displayed by the display module/device 201. The live content refers to a multimedia content which the first user and the second user start watching together.

In operation 402, the detection module 202 detects the presence of the first user and the second user. For example, the detection module 202 may detect the presence of the first user and the second user by identifying faces of the first user and the second user. According to an embodiment, the detection module 202 may detect directions of first and second users' gaze.

In operation 403, the second user goes away or does not pay attention to the display module/device 201. That is, the second user exists outside the detection area of the detection module 202 or the second user's gaze does not face the display module/device 201.

In operation 404, the detection module 202 detects the absence of the second user. That is, the detection module 202 detects the presence of the second user outside the detection area of the detection module 202. According to an embodiment, the detection module 202 may detect the second user's gaze that does not face the display module/device 201.

In operation 405, the video recording module 203 starts recording a live content while the live content is displayed on the display module/device 201 without being stopped. For example, after receiving information indicating the absence of the second user from the detection module 202, the video recording module 203 starts recording the live content.

In operation 406, the second user returns or starts paying attention to the display module/device 201. That is, the second user enters the detection area of the detection module 202 or the second user's gaze faces the display module/device 201 again.

In operation 407, the detection module 202 detects the presence of the second user. That is, the detection module 202 detects the presence of the second user within the detection area of the detection module 202. According to an embodiment, the detection module 202 may detect that the second user's gaze faces the display module/device 201.

In operation 408, the multi-view display module 204 displays the recorded content for the second user on the full screen of the display module/device 201 while the first user watches the live content on the full screen of the same display module/device 201. The multi-view display module 204 receives information indicating the presence of the second user from the detection module 202 and then displays the recorded content for the second user on the full screen of the display module/device 201.

FIGS. 5A, 5B, 5C, and 5D illustrate examples of an auto recording and a playback of a live content in a multi-view mode according to various embodiments of the present disclosure. Operations of various modules included in the electronic device described in FIGS. 5A to 5D may be performed by the electronic device 200.

Referring to FIG. 5A, the display module/device 201 displays a live content 501. The first user and the second user watch the live content on the display module/device 201 together.

Referring to FIG. 5B, the detection module 202 detects the presence of the first user and the second user. The detection module 202 may be a camera. For example, the detection module 202 may detect the presence of the first user and the second user by identifying voices of the first user and the second user. According to an embodiment, the detection module 202 may detect directions of first and second users' gaze.

Referring to FIG. 5C, when the second user goes away, the detection module 202 detects the absence of the second user. The video recording module 203 starts recording the live content 501 in a background while the display module/device 201 displays the live content 501 for the first user. The recording of the live content 501 in the background corresponds to recording the live content 501 without any influence of the video recording module 203 on the display module/device 201 that displays the live content 501.

Referring to FIG. 5D, when the second user has returned, the detection module 202 detects the presence of the second user. The multi-view display module 204 plays back a content 502 recorded in the multi-view display mode.

Figure 6:
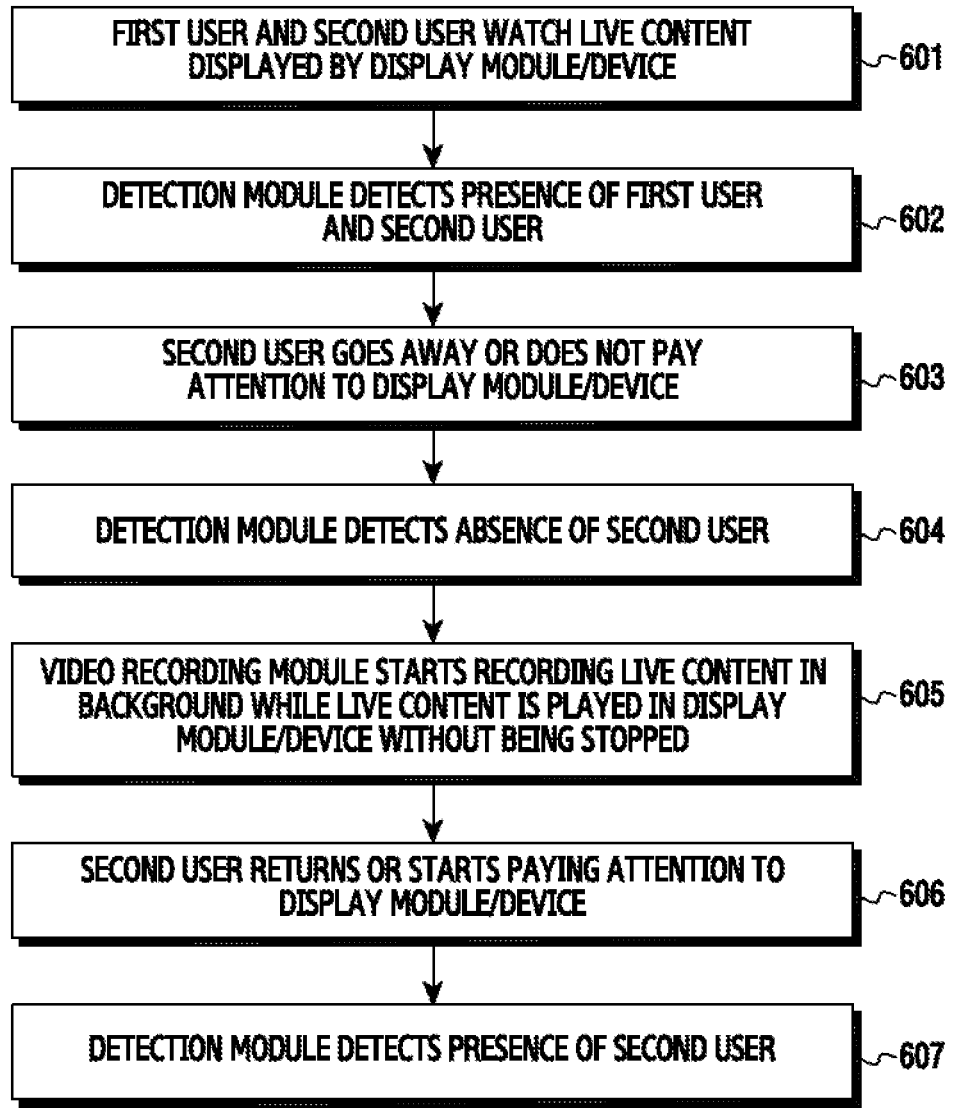
FIG. 6 illustrates an example of a flowchart for an auto recording and a playback of a live content in a picture-in-picture (PIP) mode or a split screen mode according to various embodiments of the present disclosure.

FIG. 6 illustrates an example of a flowchart for an auto recording and a playback of a live content in a PIP mode or a split screen mode according to various embodiments of the present disclosure. Operations of various modules included in the electronic device described in FIG. 6 may be performed by the electronic device 200.

Referring to FIG. 6, in operation 601, the first user and the second user watch a live content displayed by the display module/device 201.

In operation 602, the detection module 202 detects the presence of the first user and the second user. For example, when the detection module 202 can recognize a fingerprint, the detection module 202 detects the presence of the first user and the second user by identifying fingerprints of the first user and the second user. According to an embodiment, the detection module 202 may detect directions of first and second users' gaze.

In operation 603, the second user goes away or does not pay attention to the display module/device 201. That is, the second user exists outside the detection area of the detection module 202 or the second user's gaze does not face the display module/device 201.

In operation 604, the detection module 202 detects the absence of the second user. That is, the detection module 202 detects the presence of the second user outside the detection area of the detection module 202. According to an embodiment, the detection module 202 may detect the second user's gaze that does not face the display module/device 201.

In operation 605, the video recording module 203 starts recording a live content in a background while the live content is displayed on the display module/device 201 without being stopped. After receiving information indicating the absence of the second user from the detection module 202, the video recording module 203 starts recording the live content.

In operation 606, the second user returns or starts paying attention to the display module/device 201. That is, the second user enters the detection area of the detection module 202 or the second user's gaze faces the display module/device 201 again.

In operation 607, the detection module 202 detects the presence of the second user. That is, the detection module 202 detects the presence of the second user within the detection area of the detection module 202. According to an embodiment, the detection module 202 may detect that the second user's gaze faces the display module/device 201. The display module/device 201 displays a recorded content for the second user in the remaining parts of the screen of the display module/device 201 in the PIP mode or the split screen mode while the first user watches the live content in a part of the screen of the display module/device 201.

FIGS. 7A, 7B, 7C, and 7D illustrate examples of an auto recording and a playback of a live content in a split screen mode according to various embodiments of the present disclosure.

Figure 7A:
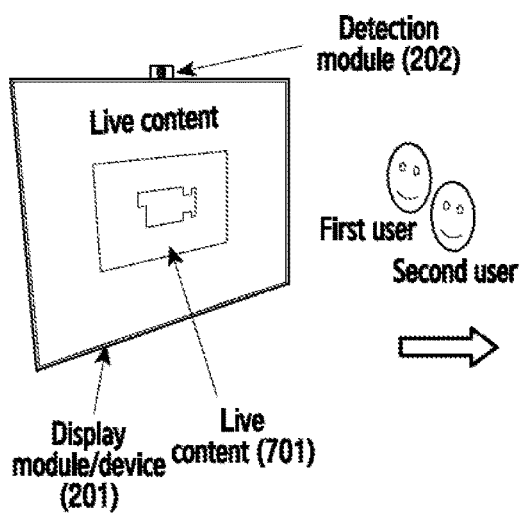
FIGS. 7A, 7B, 7C, and 7D illustrate examples of an auto recording and a playback of a live content in a split screen mode according to various embodiments of the present disclosure.

Referring to FIG. 7A, the display module/device 201 displays a live content 701. The first user and the second user watch the live content in the display module/device 201 together.

Figure 7B:
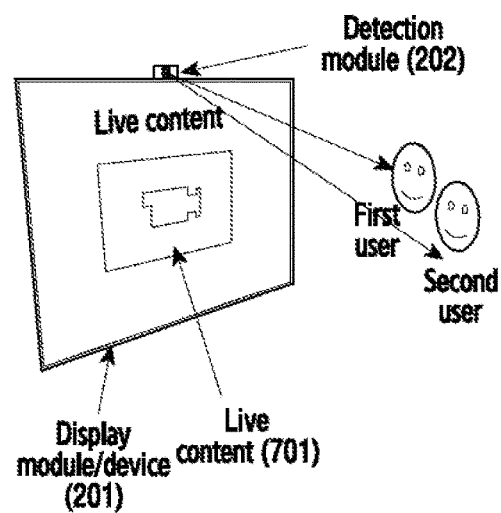

Referring to FIG. 7B, the detection module 202 detects the presence of the first user and the second user. For example, when the first user and the second user wear a wearable device that is functionally coupled with the detection module 202, the detection module 202 may detect the presence of the first user and the second user if the wearable device exists within the detection area of the detection module 202. The detection module 202 may be a camera. According to an embodiment, the detection module 202 may detect directions of first and second users' gaze.

Figure 7C:
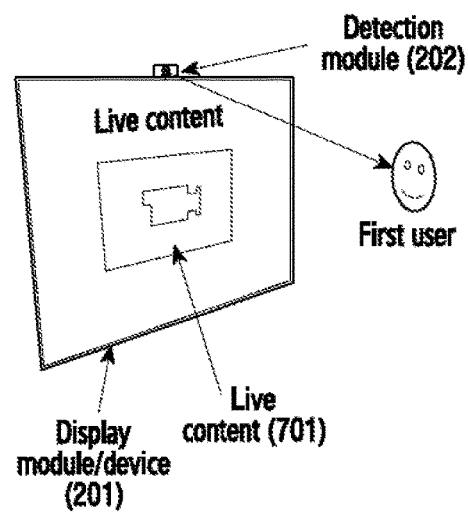

Referring to FIG. 7C, when the second user goes away, the detection module 202 detects the absence of the second user. The video recording module 203 starts recording the live content 701 in the background while the display module/device 201 continuously displays the live content 701 for the first user.

Figure 7D:
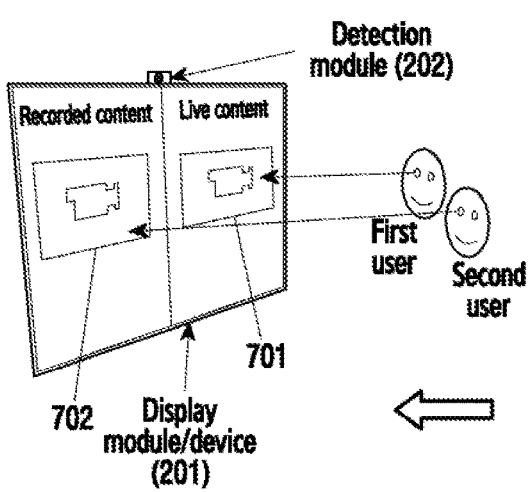

Referring to FIG. 7D, when the second user has returned, the detection module 202 detects the presence of the second user. The display module/device 201 plays back a recorded content 702 for the second user in the remaining parts of the screen of the display module/device 201 in the split screen mode while the first user watches the live content 701 in a part of the screen of the display module/device 201.

FIGS. 8A, 8B, 8C, and 8D illustrate examples of an auto recording and a playback of a live content in a PIP mode according to various embodiments of the present disclosure.

Figure 8A:
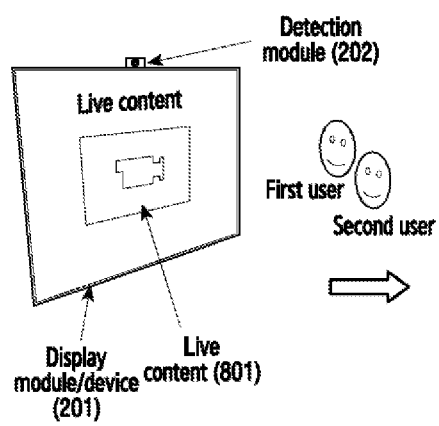
FIGS. 8A, 8B, 8C, and 8D illustrate examples of an auto recording and a playback of a live content in a PIP mode according to various embodiments of the present disclosure.

Referring to FIG. 8A, the display module/device 201 displays a live content 801. The first user and the second user watch the live content in the display module/device 201 together.

Figure 8B:
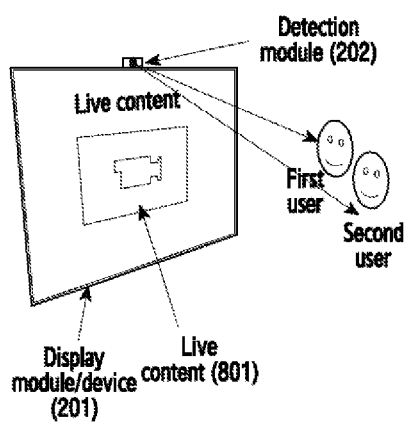

Referring to FIG. 8B, the detection module 202 detects the presence of the first user and the second user. The detection module 202 may be a camera. According to an embodiment, the detection module 202 may detect directions of the first and second users' gaze.

Figure 8D:
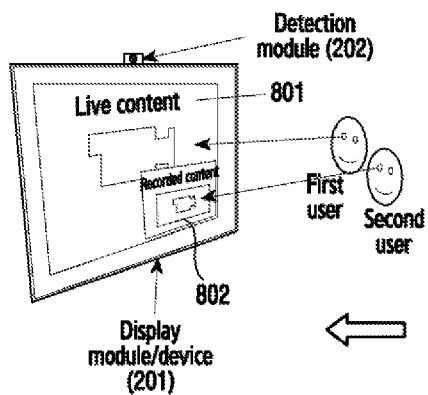
Figure 8C:
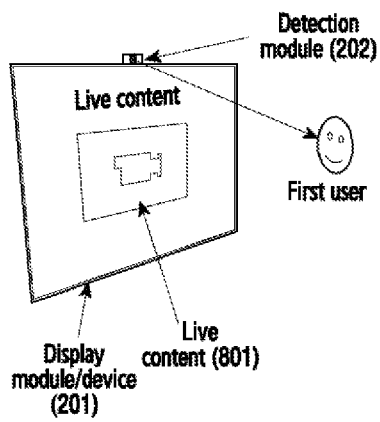

Referring to FIG. 8C, when the second user goes away, the detection module 202 detects the absence of the second user. The video recording module 203 starts recording a live content 801 in the background while the display module/device 201 continuously displays the live content 801 for the first user.

Referring to FIG. 8D, when the second user has returned, the detection module 202 detects the presence of the second user. In the PIP mode, the live content 801 for the first user is displayed in a larger portion of the screen of the display module/device 201 and a recorded live content 802 for the second user is played back in a smaller portion of the screen of the display module/device 201. According to an embodiment, in the PIP mode, the live content 801 for the first user may be displayed in the smaller portion of the screen of the display module/device 201 and the recorded content 802 for the second user may be displayed in the larger portion of the screen of the display module/device 201.

FIGS. 9A, 9B, 9C, and 9D illustrate examples of an auto recording and a playback of a live content when the user does not pay attention according to various embodiments of the present disclosure.

Figure 9A:
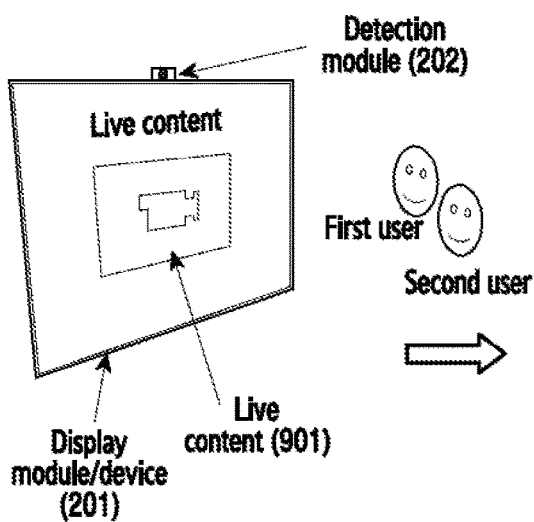
FIGS. 9A, 9B, 9C, and 9D illustrate examples of an auto recording and a playback of a live content when the user does not pay attention according to various embodiments of the present disclosure.

Referring to FIG. 9A, the first user and the second user watch together a live content displayed by the display module/device 201.

Figure 9B:
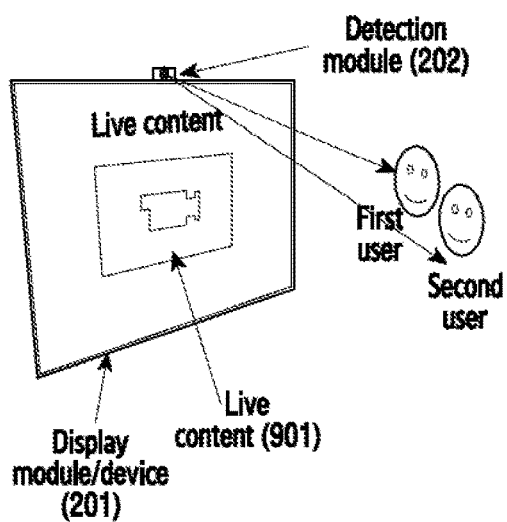

Referring to FIG. 9B, the detection module 202 detects the first user and the second user. According to an embodiment, the detection module 202 may detect directions of the first and second users' gaze.

Figure 9D:
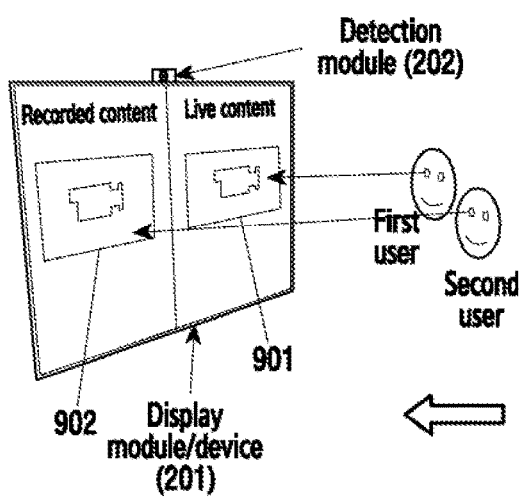
Figure 9C:
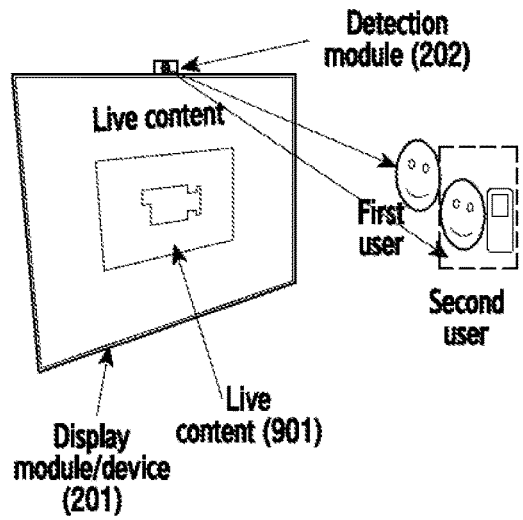

Referring to FIG. 9C, when the second user cannot pay attention to the display module/device 201 for some reason (for example, the second user has a call, is sleeping, turns his/her head, or other reasons), the detection module 202 detects the second user not paying attention to the display module/device 201 and the video recording module 203 starts recording a live content 901 in the background while the display module/device 201 continuously displays the live content 901 for the first user.

Referring to FIG. 9D, when the second user starts paying attention to the display module/device 201, the detection module 202 detects that the second user starts paying attention to the display module/device 201, displays the live content 901 for the first user in a part of the screen of the display module/device 201 in the split screen mode, and plays back a recorded content 902 for the second user in the remaining parts of the screen of the display module/device 201.

Figure 10:
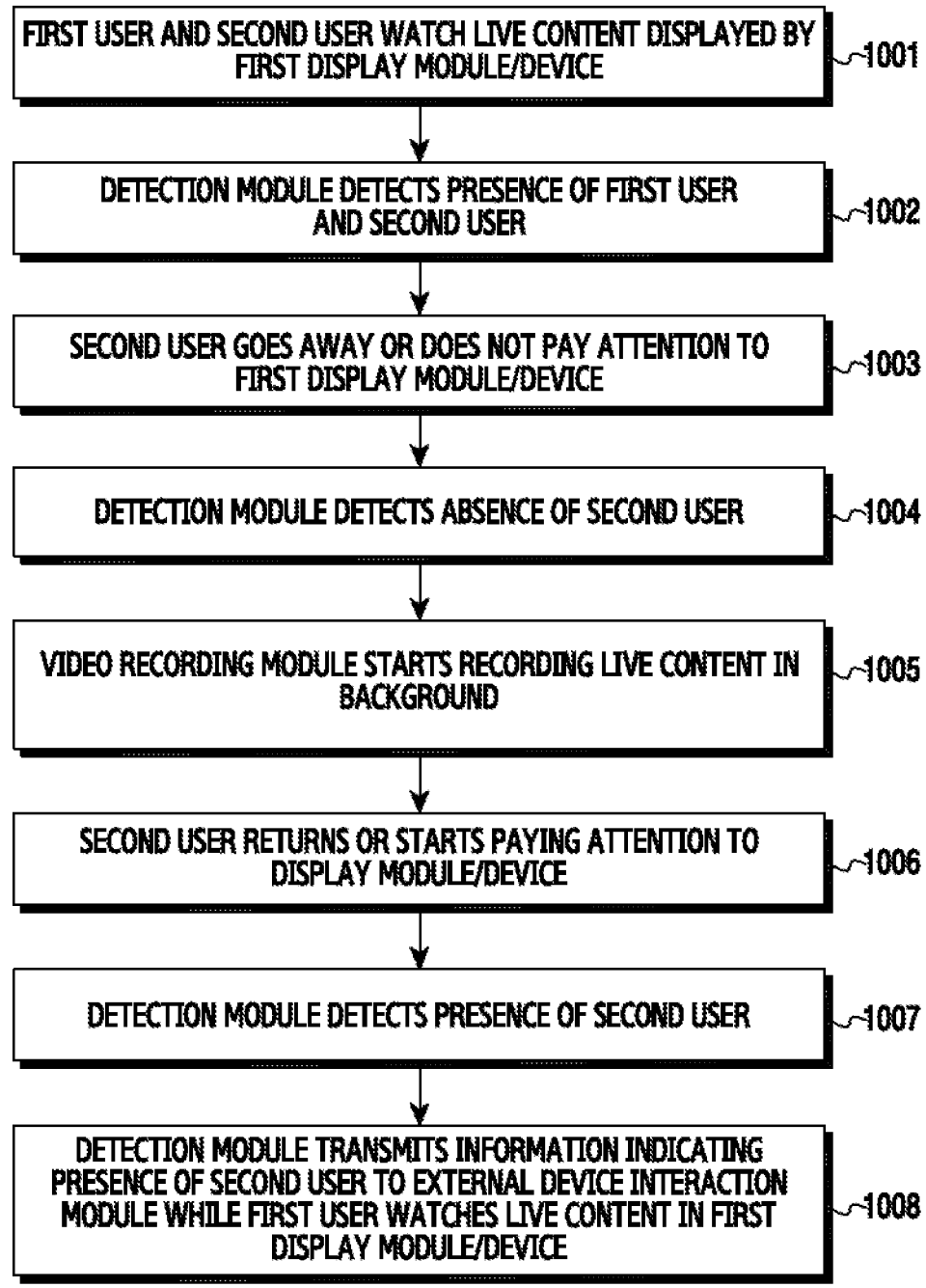
FIG. 10 illustrates an example of a flowchart for an auto recording of a live content and a playback in a second electronic device according to various embodiments of the present disclosure.

FIG. 10 illustrates an example of a flowchart for an auto recording of a live content and a playback in a second electronic device according to various embodiments of the present disclosure. Operations of various modules included in the electronic device described in FIG. 10 may be performed by the electronic device 200.

Referring to FIG. 10, in operation 1001, the first user and the second user are watching a live content in the first display module/device 201.

In operation 1002, the detection module 202 detects the presence of the first user and the second user. According to an embodiment, the detection module 202 may detect directions of the first and second users' gaze.

In operation 1003, the second user goes away or does not pay attention to the first display module/device 201. That is, the second user exists outside the detection area of the detection module 202 or the second user's gaze does not face the display module/device 201.

In operation 1004, the detection module 202 detects the absence of the second user. That is, the detection module 202 detects the presence of the second user outside the detection area of the detection module 202. According to an embodiment, the detection module 202 may detect the second user's gaze that does not face the display module/device 201.

In operation 1005, the video recording module 203 starts recording a live content in the background while the live content is displayed on the first display module/device 201 without being stopped. After receiving information indicating the absence of the second user from the detection module 202, the video recording module 203 starts recording the live content.

In operation 1006, the second user returns or starts paying attention to the display module/device 201. That is, the second user enters the detection area of the detection module 202 or the second user's gaze faces the display module/device 201 again.

In operation 1007, the detection module 202 detects the presence of the second user. That is, the detection module 202 detects the presence of the second user within the detection area of the detection module 202. According to an embodiment, the detection module 202 may detect that the second user's gaze faces the display module/device 201.

In operation 1008, the detection module 202 transmits information indicating the presence of the second user to the external device interaction module 208 while the first user watches the live content in the first display module/device 201. The external device interaction module 208 allows the second display module/device to display a recorded content for the second user. According to an embodiment, the external device interaction module 208 transmits information on the recorded multimedia content to the other electronic device.

FIGS. 11A, 11B, 11C, and 11D illustrate examples of an auto recording of a live content and a playback in the second electronic device according to various embodiments of the present disclosure.

Figure 11A:
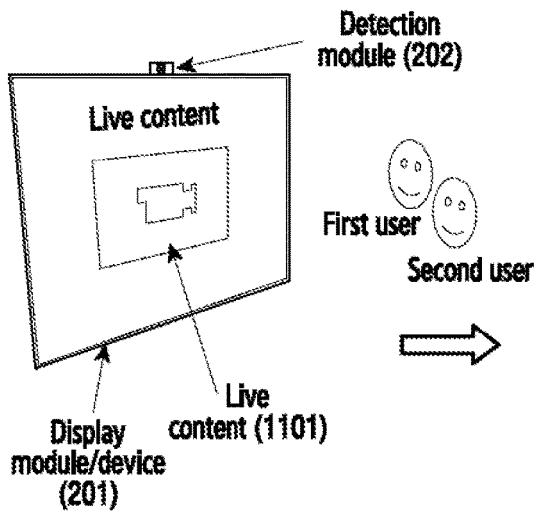
FIGS. 11A, 11B, 11C, and 11D illustrate examples of an auto recording of a live content and a playback in a second electronic device according to various embodiments of the present disclosure.

Referring to FIG. 11A, the first user and the second user are watching a live content 1101 displayed by the display module/device 201.

Figure 11B:
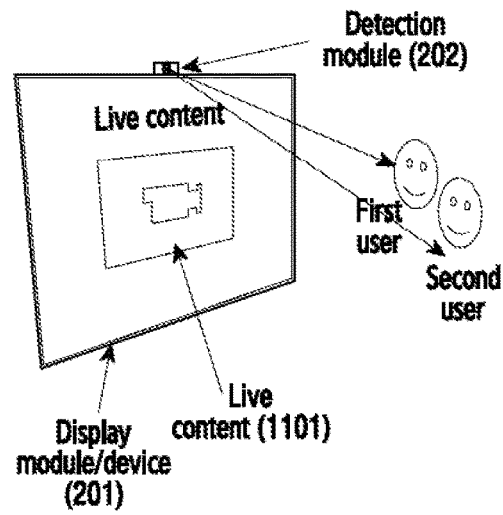

Referring to FIG. 11B, the detection module 202 detects the presence of the first user and the second user. The detection module 202 may be a camera. According to an embodiment, the detection module 202 may detect directions of the first and second users' gaze.

Figure 11D:
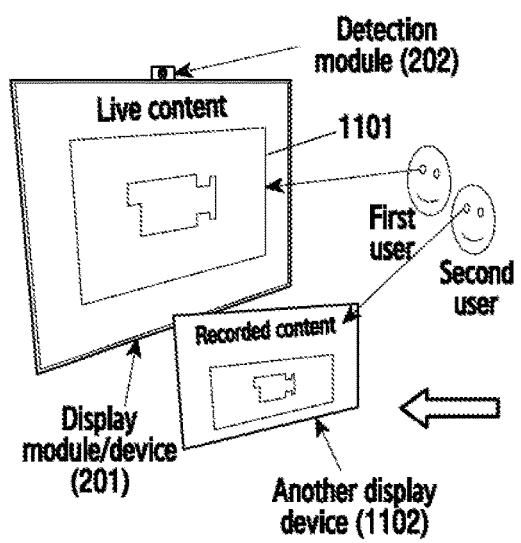
Figure 11C:
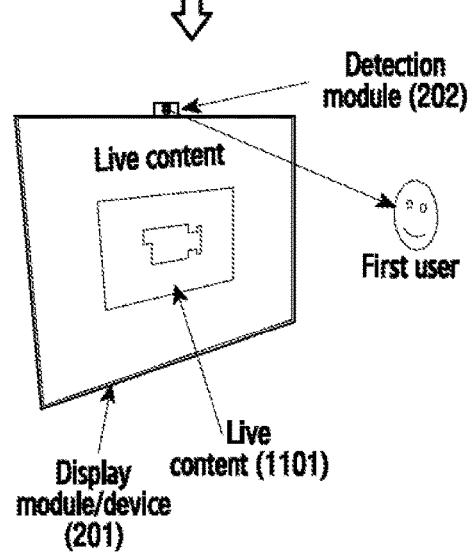

Referring to FIG. 11C, when the second user goes away, the detection module 202 detects the absence of the second user. The video recording module 203 starts recording a live content 1101 in the background while the display module/device 201 continuously displays the live content 1101 for the first user.

Referring to FIG. 11D, when the second user has returned, the detection module 202 detects the presence of the second user. The external device interaction module 208 transmits the recorded content 1102 to the second electronic device to allow the second user to watch the recorded content 1102 while the first user watches the played live content 1101 on the first display module/device 201 without being stopped. However, the first display module/device 210 may provide (render) the recorded content 1102 for the second user while the external device interaction module 208 transmits the live content 1101 to the second electronic device.

Figure 12:
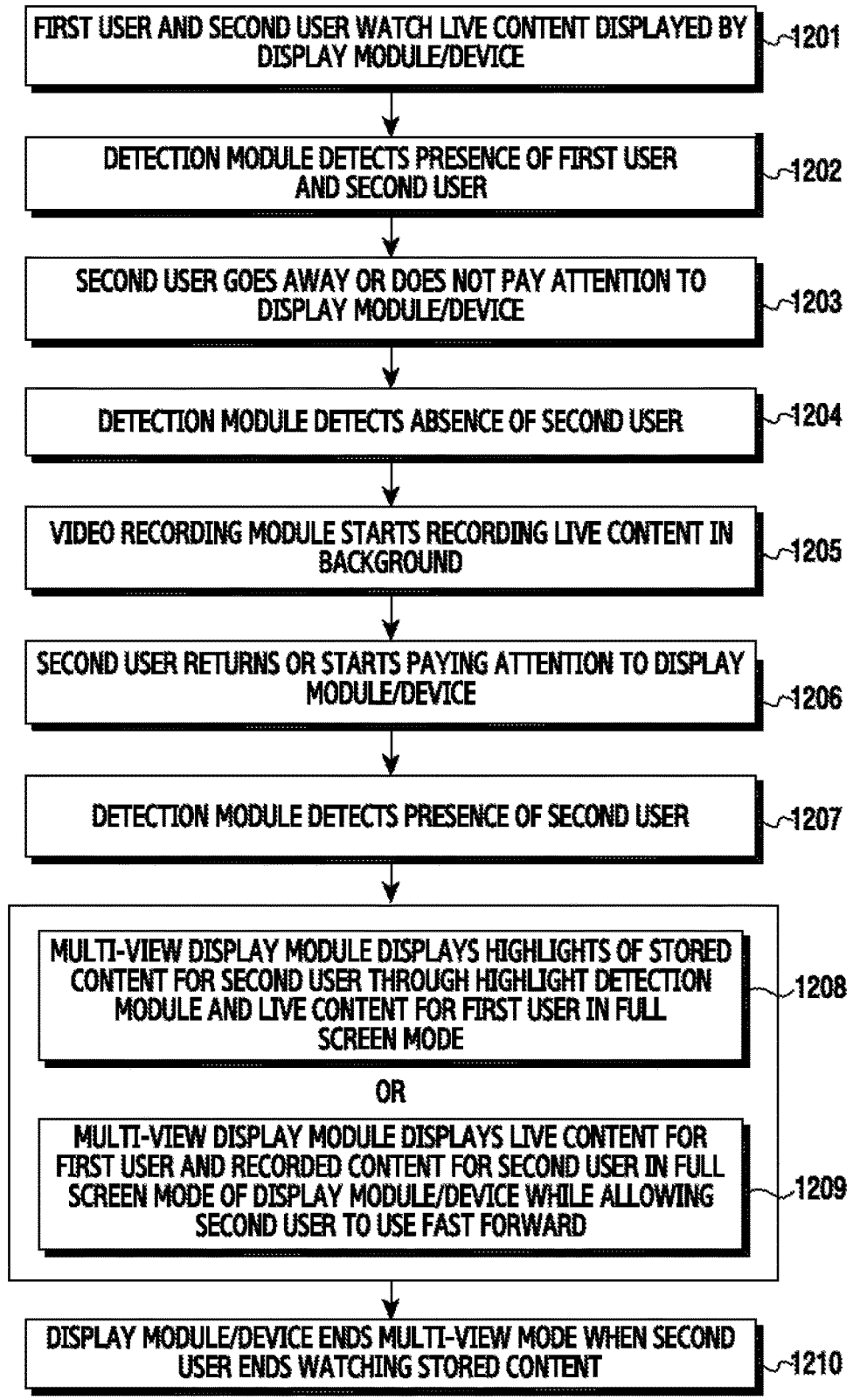
FIG. 12 illustrates an example of a flowchart for an auto recording and a playback of a live content in a full screen mode according to various embodiments of the present disclosure.

FIG. 12 illustrates an example of a flowchart for an auto recording and a playback of a live content in a full screen mode according to various embodiments of the present disclosure. Operations of various modules included in the electronic device described in FIG. 12 may be performed by the electronic device 200.

Referring to FIG. 12, in operation 1201, the first user and the second user are watching a live content displayed by the display module/device 201.

In operation 1202, the detection module 202 detects the presence of the first user and the second user. According to an embodiment, the detection module 202 may detect directions of the first and second users' gaze.

In operation 1203, the second user goes away or does not pay attention to the display module/device 201. That is, the second user exists outside the detection area of the detection module 202 or the second user's gaze does not face the display module/device 201.

In operation 1204, the detection module 202 detects the absence of the second user. That is, the detection module 202 detects the presence of the second user outside the detection area of the detection module 202. According to an embodiment, the detection module 202 may detect the second user's gaze that does not face the display module device 201.

In operation 1205, the video recording module 203 starts recording the live content in the background while the live content is displayed in the display module/device 201 to be watched by the first user without being stopped. After receiving information indicating the absence of the second user from the detection module 202, the video recording module 203 starts recording the live content.

In operation 1206, the second user returns or starts paying attention to the display module/device 201. That is, the second user enters the detection area of the detection module 202 or the second user's gaze faces the display module/device 201 again.

In operation 1207, the detection module 202 detects the presence of the second user. That is, the detection module 202 detects the presence of the second user within the detection area of the detection module 202. According to an embodiment, the detection module 202 may detect that the second user's gaze faces the display module device 201. The detection module 202 operates the multi-view display module 204.

In operation 1208, the multi-view display module 204 displays highlights of the content stored for the second user through the highlight detection module 206 and the live content for the first user in the full screen mode. According to an embodiment, the multi-view display module 204 displays highlights of the content stored for the second user through the highlight detection module 206 and the live content for the first user in the split screen mode or the PIP mode. According to another embodiment, the display module/device 201 displays the live content for the first user and a display module/device of another electronic device displays highlights of the content stored for the second user through a highlight detection module of another electronic device.

In operation 1209, the multi-view display module 204 displays the live content for the first user and the recorded content for the second user in the full screen mode of the display module/device 201 while making the second user use fast forward. The fast forward refers to a control function of a trick play mode for making a control to fast play the displayed content. According to an embodiment, the multi-view display module 204 displays the live content for the first user and the recorded content for the second user in the split screen mode or the PIP mode of the display module/device 201 while allowing the second user to use a trick play for fast playing the stored content. According to another embodiment, the display module/device 201 displays the live content for the first user, and a display module/device of another electronic device displays the recorded content for the second user while allowing the second user to use the trick play for fast playing the recorded content. According to an implementation of the present disclosure, one of operations 1208 and 1209 is selectively performed.

In operation 1210, the display module/device 201 ends the multi-view mode while the second user ends watching the stored content. After the multi-view mode ends, two users watch the same live content in the display module/device 201.

FIGS. 13A, 13B, 13C, 13D, and 13E illustrate examples of an auto recording and a playback of a live content in a full screen mode according to various embodiments of the present disclosure.

Figure 13A:
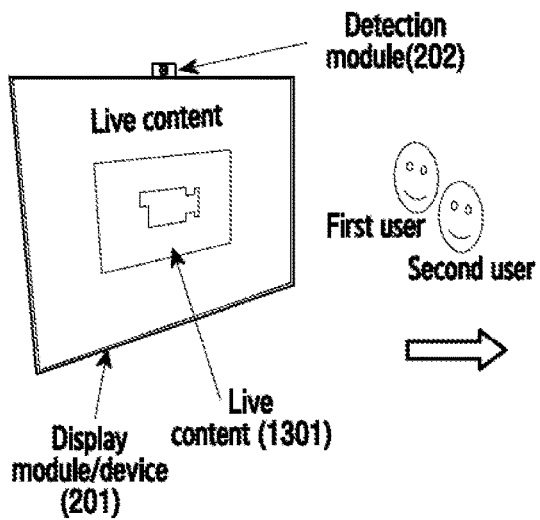
FIGS. 13A, 13B, 13C, 13D, and 13E illustrate examples of an auto recording and a playback of a live content in a full screen mode according to various embodiments of the present disclosure.

Referring to FIG. 13A, the first user and the second user are watching a live content 1301 displayed by the display module/device 201 together.

Figure 13B:
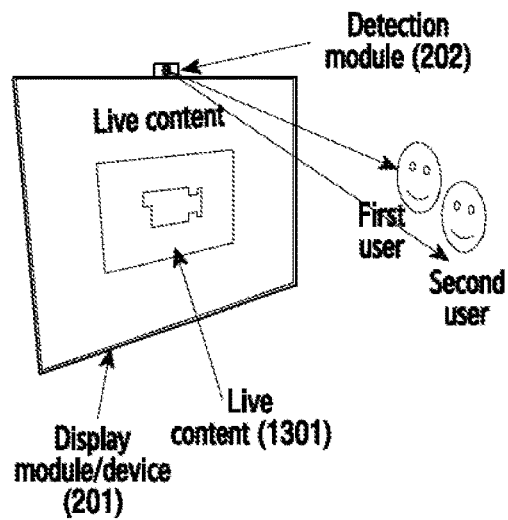

Referring to FIG. 13B, the detection module 202 detects the first user and the second user. The detection module 202 may be a camera. According to an embodiment, the detection module 202 may detect directions of the first and second users' gaze.

Figure 13D:
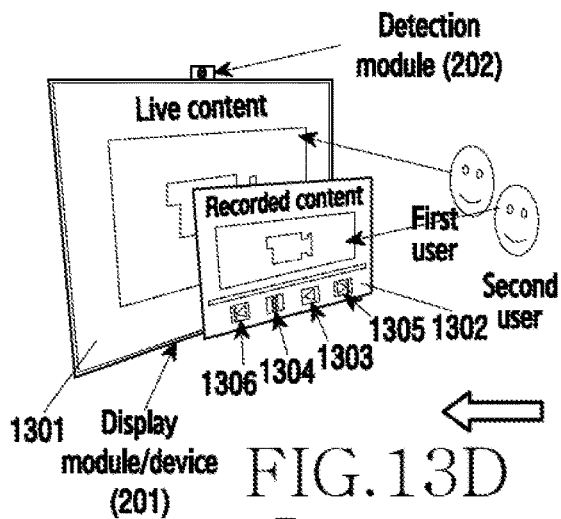
Figure 13C:
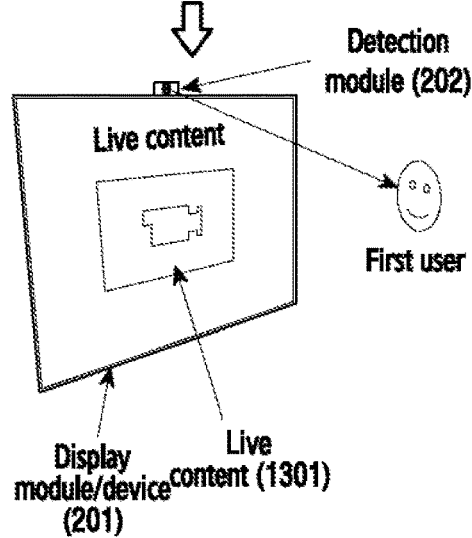

Referring to FIG. 13C, when the second user goes away, the detection module 202 detects the absence of the second user. The video recording module 203 starts recording a live content 1301 in the background while the display module/device 201 continuously displays the live content 1301 for the first user.

Referring to FIG. 13D, when the second user has returned, the detection module 202 detects the presence of the second user. The multi-view display module 204 plays back a recorded content 1302 in the form of highlights or in a trick play mode of the multi-view mode. The multi-view display module 204 plays back the recorded content 1302 in the trick play mode for controlling a playback of the recorded content 1302. A control function of the trick play mode may include a playback 1303, a stop 1304, a fast forward 1305, and a fast rewind 1306.

Figure 13E:
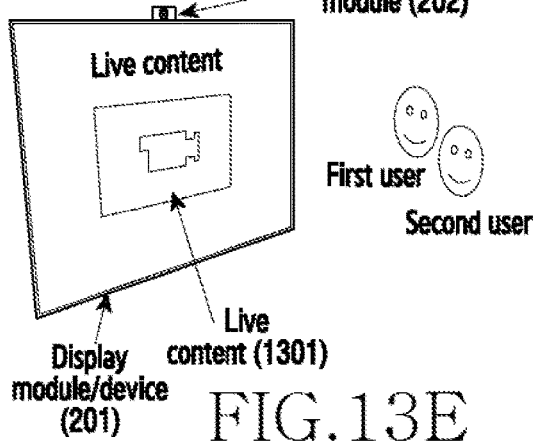

Referring to FIG. 13E, when the second user finishes the recorded content 1302 by using the fast forward 1305 to fast watch the recorded content 1302, the multi-view display mode ends, and the first user and the second user watch the same live content 1301 in the display module/device 201.

FIGS. 14A, 14B, 14C, 14D, 14E, and 14F illustrate examples of an auto recording and a playback of a live content for four users according to various embodiments of the present disclosure. An implementation of the present disclosure is not limited to the number of users.

Figure 14A:
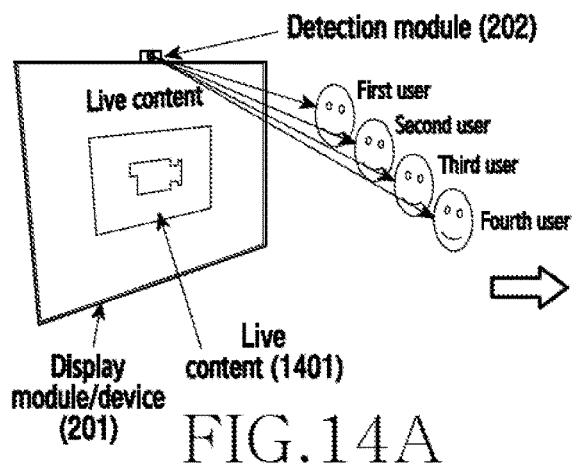
FIGS. 14A, 14B, 14C, 14D, 14E, and 14F illustrate examples of an auto recording and a playback of a live content for four users according to various embodiments of the present disclosure.

Referring to FIG. 14A, four users (first user, second user, third user, and fourth user) are watching a live content 1401 in the display module/device 201. The detection module 202 detects all four users. The detection module 202 may be a camera. 1401

Figure 14B:
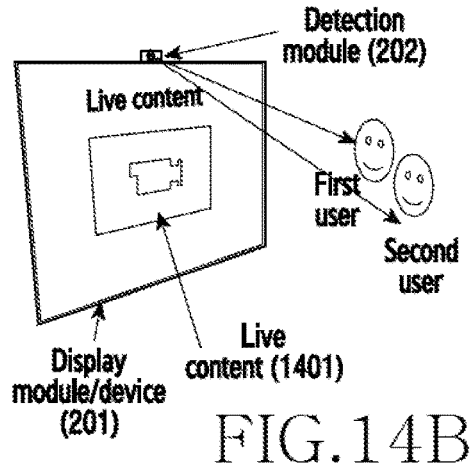

Referring to FIG. 14B, when the third user and the fourth user go away, the detection module 202 detect the absence of the third user and the fourth user. The video recording module 203 records a content for the third user and a content for the fourth user while the display module/device 201 plays the live content 1401 for the first user and the second user without stopping the live content 1401.

Figure 14D:
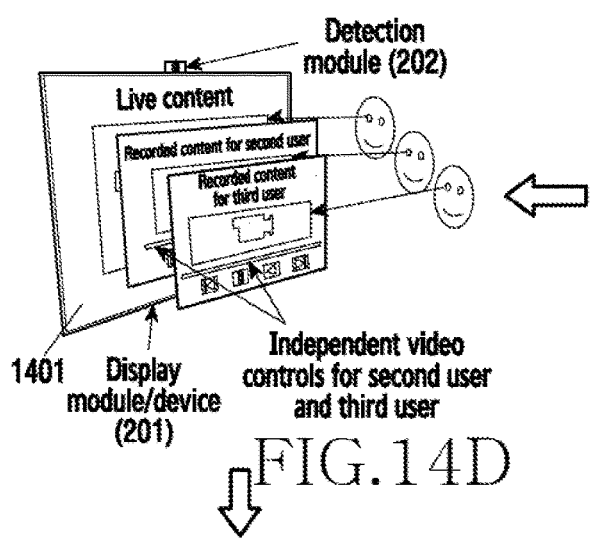
Figure 14C:
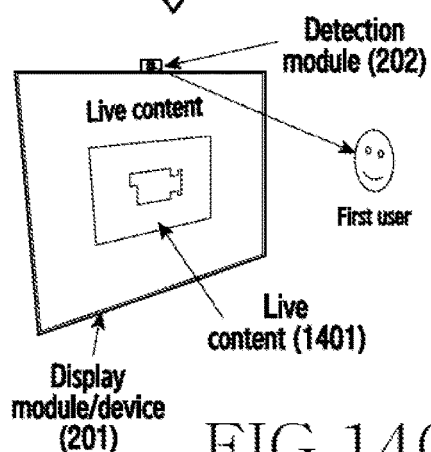

Referring to FIG. 14C, when the second user goes away, the detection module 202 detects the absence of the second user. The video recording module 203 records the content for the second user in the background while the display module/device 201 plays the live content 1401 for the first user without stopping the live content 1401. According to an embodiment, when the live content 1401 is one of the streamed content and the content stored in the electronic device, the video recording module 203 may not record the content for the second user in the background.

Referring to FIG. 14D, when the second user and the third user have returned or start paying attention to the display module/device 201, the detection module 202 detects the presence of the second user and the third user. The display module/device 201 plays the recorded content for the second user and the recorded content for the third user in the full screen mode. The playback of the recorded content for the second user is independent from the playback of the recorded content for the third user and the playback of the recorded content for the first user. According to an embodiment, the playbacks of the recorded content for the second user and the recorded content for the third user may be performed in one of the PIP mode and the split screen mode or performed by the second electronic device. The playback of the recorded content for the second user and the playback of the recorded content for the third user may be in the form of playing the recorded content or highlights in a trick play mode having various control functions such as playback, stop, fast forward, or fast rewind. The display module/device 201 displays the recorded content for the second user and the recorded content for the third user in a multi-user trick play mode in which each user has an independent control for the trick play functions.

Figure 14E:
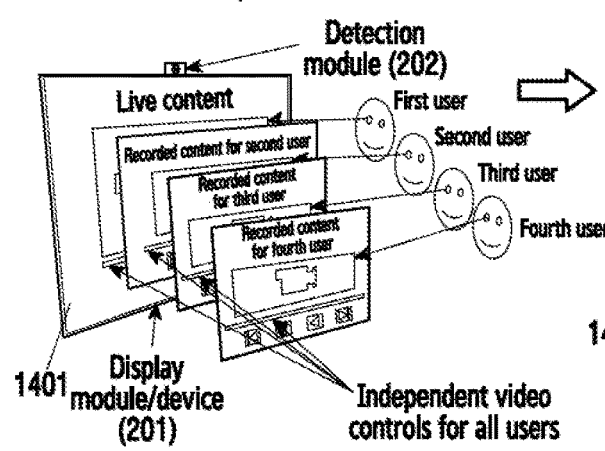

Referring to FIG. 14E, when the fourth user has returned, the detection module 202 detects the presence of the fourth user. The multi-view display module 204 plays back the recorded content for the fourth user in the multi-user trick play mode in which the fourth user has an independent control for the trick play functions.

Figure 14F:
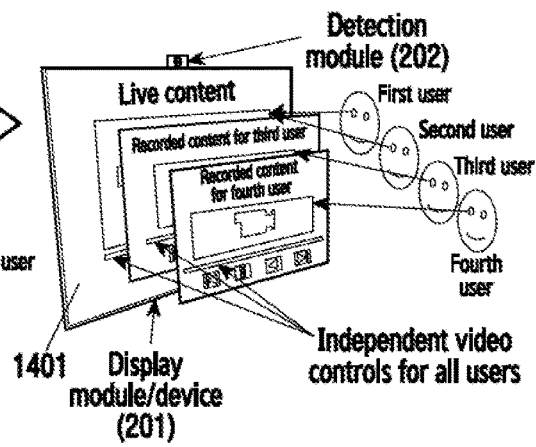

Referring to FIG. 14F, when the second user finishes the recorded content for the second user by using a fast forward function of the control functions in the trick play mode, the full screen related to the second user ends, and the first user and the second user watch the live content in the single screen.

Figure 15:
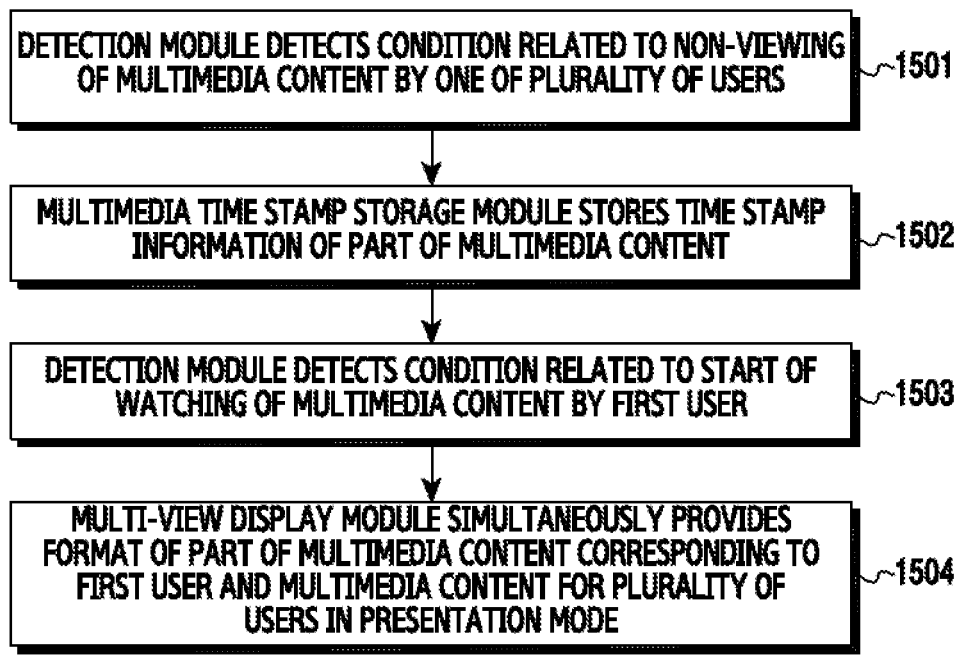
FIG. 15 illustrates an example of a flowchart for displaying a content starting from a stored time stamp according to various embodiments of the present disclosure.

FIG. 15 illustrates an example of a flowchart for displaying a content starting from a stored time stamp according to various embodiments of the present disclosure. Operations of various modules included in the electronic device described in FIG. 15 may be performed by the electronic device 200.

Referring to FIG. 15, in operation 1501, the detection module 202 detects a condition related to non-viewing of a multimedia content by one of a plurality of users. According to an embodiment, the detection module 202 may detect the absence of one of the plurality of users or detect that the user's gaze does not face the electronic device 200.

In operation 1502, the multimedia time stamp storage module 207 stores time stamp information of a part of the multimedia content. The time stamp information includes information on a time point when the condition related to non-viewing of the multimedia content by one of the plurality of users is detected.

In operation 1503, the detection module 202 detects a condition related to one of the plurality of users starting viewing the multimedia content. According to an embodiment, the detection module 202 may detect the presence of one user or detect that one user's gaze faces the electronic device 200.

In operation 1504, the multi-view display module 204 simultaneously provides a format of the part of the multimedia content corresponding to one of the plurality of users and the multimedia content for the plurality of users in the presentation mode. The format is based on time stamp information.

Figure 16:
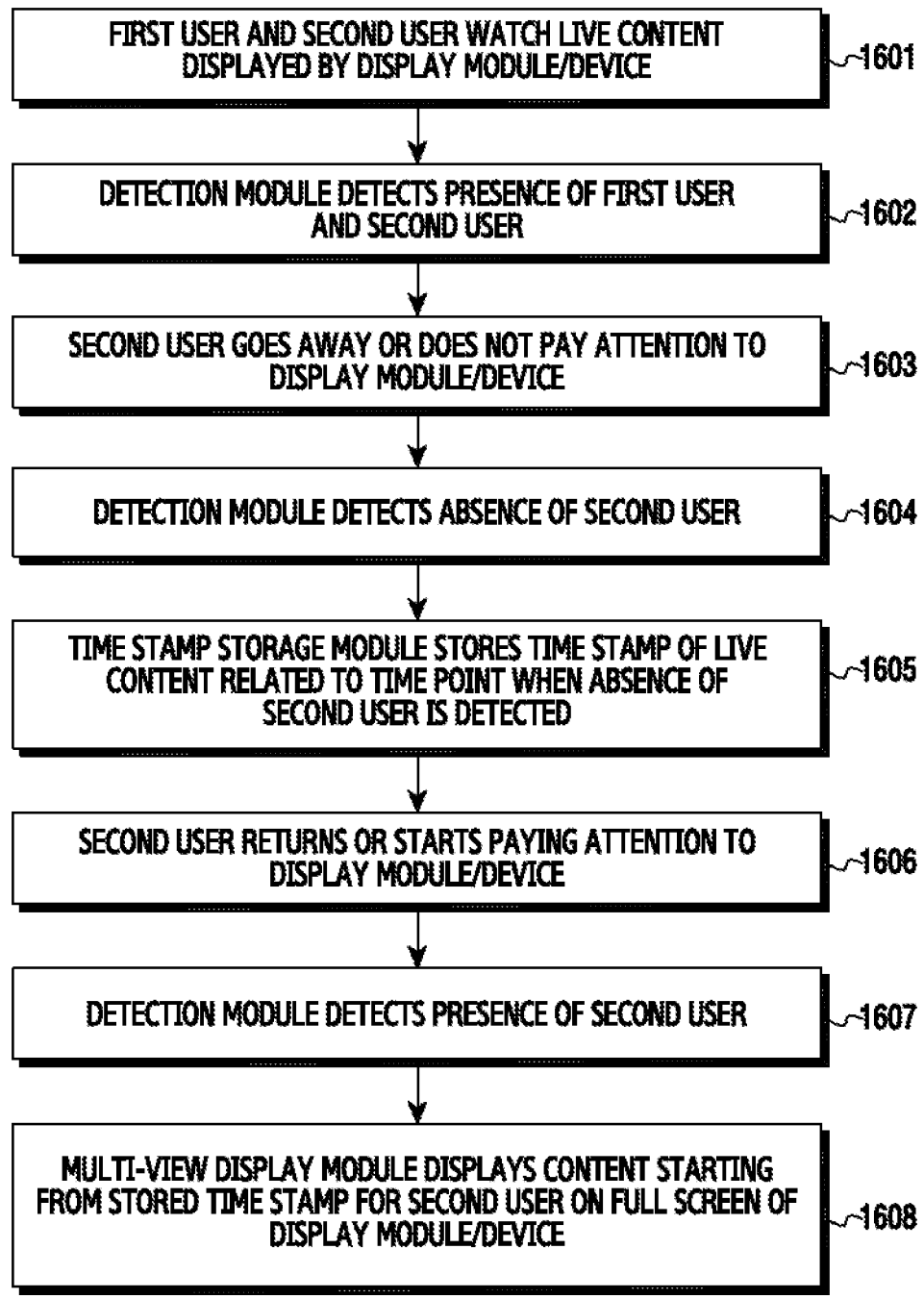
FIG. 16 illustrates an example of a flowchart for displaying a content starting from a stored time stamp in a full screen mode according to various embodiments of the present disclosure.

FIG. 16 illustrates an example of a flowchart for displaying a content started from a stored time stamp in the full screen mode according to various embodiments of the present disclosure. Operations of various modules included in the electronic device described in FIG. 16 may be performed by the electronic device 200.

Referring to FIG. 16, in operation 1601, the first user and the second user are watching a live content displayed by the display module/device 201. The live content is a streaming content.

In operation 1602, the detection module 202 detects the presence of the first user and the second user. According to an embodiment, the detection module 202 may detect directions of the first and second users' gaze.

In operation 1603, the second user goes away or does not pay attention to the display module/device 201. That is, the second user exists outside the detection area of the detection module 202 or the second user's gaze does not face the display module/device 201.

In operation 1604, the detection module 202 detects the absence of the second user. That is, the detection module 202 detects the presence of the second user outside the detection area of the detection module 202. According to an embodiment, the detection module 202 may detect the second user's gaze that does not face the display module device 201.

In operation 1605, the time stamp storage module 207 stores a time stamp of the live content related to a time point when the absence of the second user is detected while the display module/device 201 displays the live content to prevent the playback of the live content from being stopped.

In operation 1606, the second user returns or starts paying attention to the display module/device 201. That is, the second user enters the detection area of the detection module 202 or the second user's gaze faces the display module/device 201 again.

In operation 1607, the detection module 202 detects the presence of the second user. That is, the detection module 202 detects the presence of the second user within the detection area of the detection module 202. According to an embodiment, the detection module 202 may detect that the second user's gaze faces the display module device 201.

In operation 1608, the multi-view display module 204 displays the content starting from the stored time stamp for the second user on the full screen of the display module/device 201 while the first user watches the live content on the full screen of the same display module/device 201.

Figure 17:
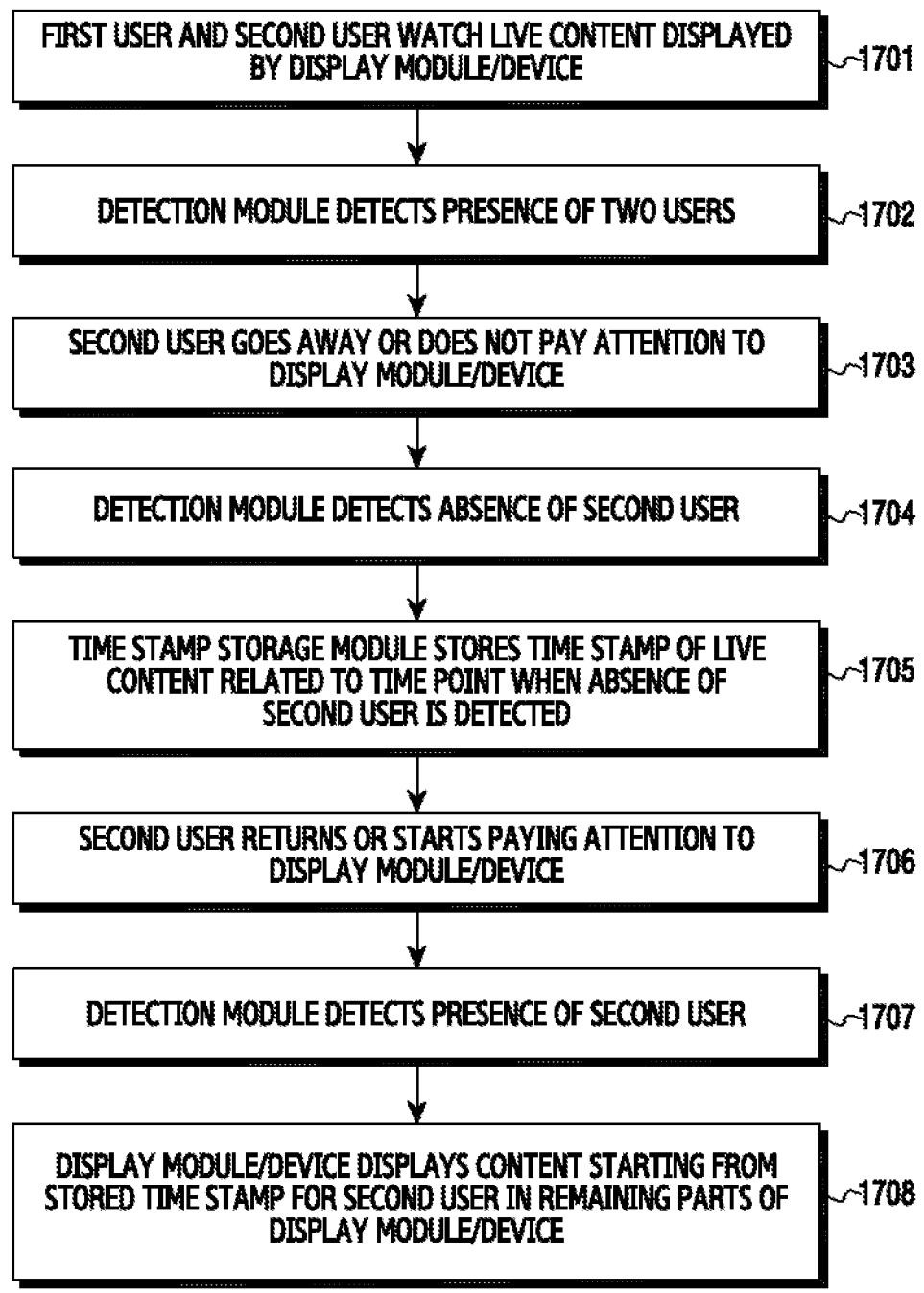
FIG. 17 illustrates an example of a flowchart for displaying a content starting from a stored time stamp in a split screen mode or a PIP mode according to various embodiments of the present disclosure.

FIG. 17 illustrates an example of a flowchart for displaying a content starting from a stored time stamp in the split screen mode or the PIP mode according to various embodiments of the present disclosure. Operations of various modules included in the electronic device described in FIG. 17 may be performed by the electronic device 200.

Referring to FIG. 17, in operation 1701, the first user and the second user are watching a live content displayed by the display module/device 201. The live content is a streaming content.

In operation 1702, the detection module 202 detects the presence of two users. According to an embodiment, the detection module 202 may detect directions of first and second users' gaze.

In operation 1703, the second user goes away or does not pay attention to the display module/device 201. That is, the second user exists outside the detection area of the detection module 202 or the second user's gaze does not face the display module/device 201.

In operation 1704, the detection module 202 detects the absence of the second user. That is, the detection module 202 detects the presence of the second user outside the detection area of the detection module 202. According to an embodiment, the detection module 202 may detect the second user's gaze that does not face the display module device 201.

In operation 1705, the time stamp storage module 207 stores a time stamp of the live content related to a time point when the absence of the second user is detected while the display module/device 201 displays the live content to prevent the playback of the live content from being stopped.

In operation 1706, the second user returns or starts paying attention to the display module/device 201. That is, the second user enters the detection area of the detection module 202 or the second user's gaze faces the display module/device 201 again.

In operation 1707, the detection module 202 detects the presence of the second user. That is, the detection module 202 detects the presence of the second user within the detection area of the detection module 202. According to an embodiment, the detection module 202 may detect that the second user's gaze face the display module device 201.

In operation 1708, the display module/device 201 displays a content starting from the stored time stamp for the second user in the remaining parts of the screen of the display module/device 201 while the first user watches the live content in a part of the screen of the same display module/device 201 in the PIP mode or the split screen mode.

Figure 18:
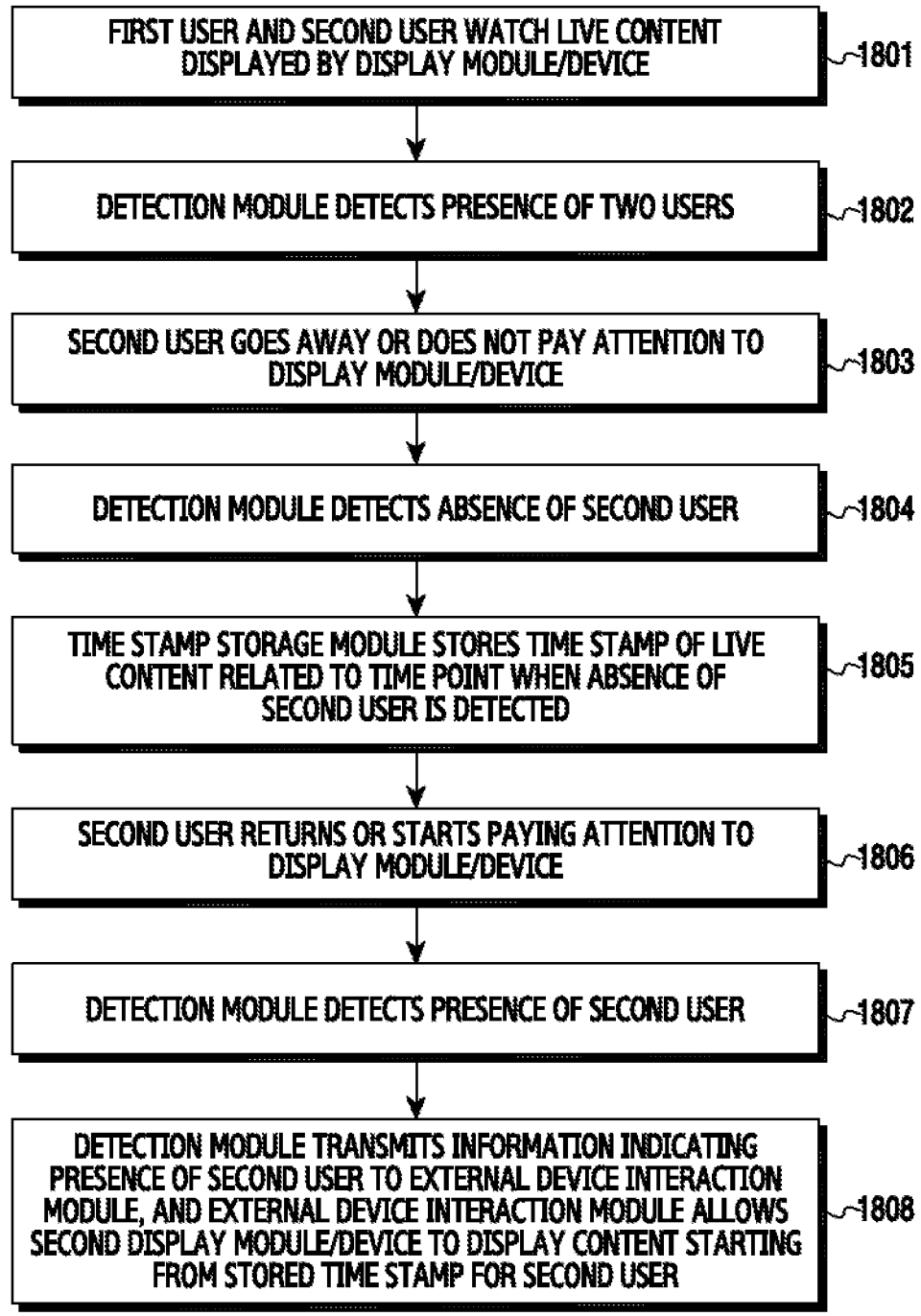
FIG. 18 illustrates an example of another flowchart for displaying a content starting from a stored time stamp in a second electronic device according to various embodiments of the present disclosure.

FIG. 18 illustrates an example of another flowchart for displaying a content starting from a stored time stamp in a second electronic device according to various embodiments of the present disclosure. Operations of various modules included in the electronic device described in FIG. 18 may be performed by the electronic device 200.

Referring to FIG. 18, in operation 1801, the first user and the second user are watching a live content displayed by the first display module/device 201. The live content is a streaming content.

In operation 1802, the detection module 202 detects the presence of two users. According to an embodiment, the detection module 202 may detect directions of first and second users' gaze.

In operation 1803, the second user goes away or does not pay attention to the first display module/device 201. That is, the second user may exist outside the detection area of the detection module 202, or the second user's gaze does not face the first display module/device 201.

In operation 1804, the detection module 202 detects the absence of the second user. That is, the detection module 202 detects the presence of the second user outside the detection area of the detection module 202. According to an embodiment, the detection module 202 may detect the second user's gaze that does not face the display module device 201.

In operation 1805, the time stamp storage module 207 stores a time stamp of the live content related to a time point when the absence of the second user is detected while the first display module/device 201 displays the live content to prevent the playback of the live content from being stopped.

In operation 1806, the second user returns or starts paying attention to the first display module/device 201. That is, the second user enters the detection area of the detection module 202, or the second user's gaze faces the first display module/device 201.

In operation 1807, the detection module 202 detects the presence of the second user. That is, the detection module 202 detects the presence of the second user within the detection area of the detection module 202. According to an embodiment, the detection module 202 may detect that the second user's gaze faces the first display module device 201.

In operation 1808, the detection module 202 transmits information indicating the presence of the second user to the external device interaction module 208 while the first user watches the live content in the first display module/device 201. The external device interaction module 208 allows the second display module/device to display the content starting from the stored time stamp for the second user. According to an embodiment, the external device interaction module 208 transmits information on the content starting from the stored time stamp for the second user to the second electronic device.

Figure 19:
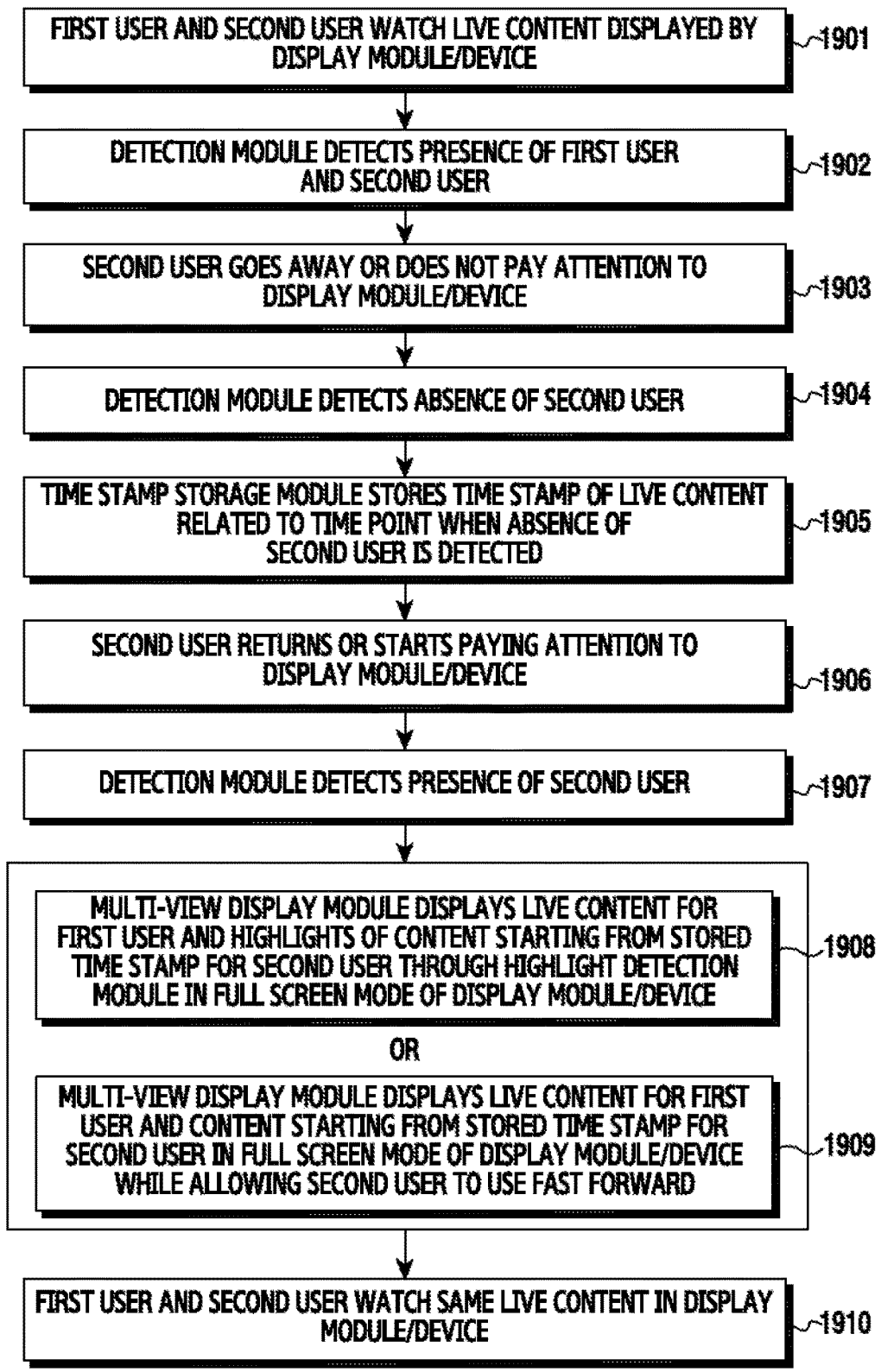
FIG. 19 illustrates an example of a flowchart for displaying a content starting from a stored time stamp in a trick play mode or a highlight mode according to various embodiments of the present disclosure.

FIG. 19 illustrates an example of a flowchart for displaying a content starting from a stored time stamp in a trick play mode or a highlight mode according to various embodiments of the present disclosure. Operations of various modules included in the electronic device described in FIG. 19 may be performed by the electronic device 200.

Referring to FIG. 19, in operation 1901, the first user and the second user are watching a live content in the display module/device 201. The live content may be a streaming content.

In operation 1902, the detection module 202 detects the presence of two users. According to an embodiment, the detection module 202 may detect directions of first and second users' gaze.

In operation 1903, the second user goes away or does not pay attention to the display module/device 201. That is, the second user exists outside the detection area of the detection module 202 or the second user's gaze does not face the display module/device 201.

In operation 1904, the detection module 202 detects the absence of the second user. That is, the detection module 202 detects the presence of the second user outside the detection area of the detection module 202. According to an embodiment, the detection module 202 may detect the second user's gaze that does not face the display module device 201.

In operation 1905, the time stamp storage module 207 stores a time stamp of the live content related to a time point when the absence of the second user is detected while the display module/device 201 displays the live content to prevent the playback of the liven content from being stopped.

In operation 1906, the second user returns or starts paying attention to the display module/device 201. That is, the second user enters the detection area of the detection module 202 or the second user's gaze faces the display module/device 201 again.

In operation 1907, the detection module 202 detects the presence of the second user. The detection module 202 detects the presence of the second user within the detection area of the detection module 202. According to an embodiment, the detection module 202 may detect that the second user's gaze faces the display module device 201.

In operation 1908, the multi-view display module 204 displays the live content for the first user in the full screen mode of the display module/device 201 and highlights of the content starting from a stored time stamp for the second user by using the highlight detection module 206.

In operation 1909, the multi-view display module 204 displays the live content for the first user and the content starting from the stored time stamp for the second user in the full screen mode of the display module/device 201 while allowing the second user to use the fast forward. The fast forward refers to a control function of a trick play mode for making a control to fast play the displayed content.

In operation 1910, when the second user ends watching the content starting from the stored time stamp, the multi-view mode ends, and the first user and the second user watch the same live content in the display module/device 201.

FIGS. 20A, 20B, 20C, 20D, 20E, and 20F illustrate examples for displaying a content starting from a stored time stamp according to various embodiments of the present disclosure. Operations of various modules included in the electronic device described in FIGS. 20A to 20F may be performed by the electronic device 200.

Referring to FIG. 20A, the first user and the second user watch a live content 2001 in the display module/device 201. The detection module 202 detects the first user and the second user. The live content 2001 may be a streaming content. For example, the live content 2001 may be a content streamed through a web application.

Referring to FIG. 20B, the second user goes away or does not pay attention to the display module/device 201. The detection module 202 detects the absence of the second user or non-viewing of the live content 2001 by the second user. A time stamp related to the absence of the second user or the non-viewing of the live content 2001 by the second user is stored as "t2". When the second user returns or starts paying attention to the display module/device 201, the detection module 202 detects the presence of the second user or viewing of the content by the second user.

Referring to FIG. 20C, the detection module 202 operates the multi-view display module 204. The multi-view display module 204 displays the content starting from the stored time stamp "t2" for the second user on the full screen of the display module/device 201 while the first user watches the live content 2001 on the full screen of the same display module/device 201. In the trick play mode for controlling the playback of the recorded content, the multi-view display module 204 displays the content starting from the stored time stamp "t2" for the second user.

Referring to FIG. 20D, the multi-view display module 204 displays the content starting from the stored time stamp "t2" for the second user in the remaining parts of the screen of the display module/device 201 in the split screen mode while the first user watches the live content 2001 in a part of the screen of the display module/device 201.

Referring to FIG. 20E, the multi-view display module 204 displays the content starting from the stored time stamp "t2" for the second user on the screen of the display module/device 201 in the PIP mode while the first user watches the live content 2001 on the screen of the display module/device 201.

Referring to FIG. 20F, the multi-view display module 204 interacts with the second display module/device 2002 to display the content starting from the stored time stamp "t2" for the second user in the second display module/device while the first user watches the live content 2001 on the screen of the first display module/device 201.

According to an embodiment, one of the plurality of users may select at least one of the various modes of the electronic device 200 described in FIGS. 20C to 20F through a popup window displayed in the display module/device 201. According to another embodiment, the various modes of the electronic device 200 described in FIGS. 20C to 20F may be determined by settings that have been already configured by the user. According to another embodiment, the various modes of the electronic device 200 described in FIGS. 20C to 20F may be determined based on the performance of the electronic device 200.

According to the embodiments described in FIGS. 15 and 20A to 20F, a method of playing back the recorded content includes an operation of storing time stamp information of a part of a displayed multimedia content as at least one user detects a condition related to non-viewing of the multimedia content and an operation of displaying a multimedia content starting from a stored time stamp for the at least one user as the at least one user detects a condition related to viewing of the multimedia content. According to an embodiment, an electronic device that implements the method described in FIGS. 15 and 20A to 20F may be an electronic device including the smaller number of components compared to the components of the electronic device 200 described in FIG. 2.

Figure 21:
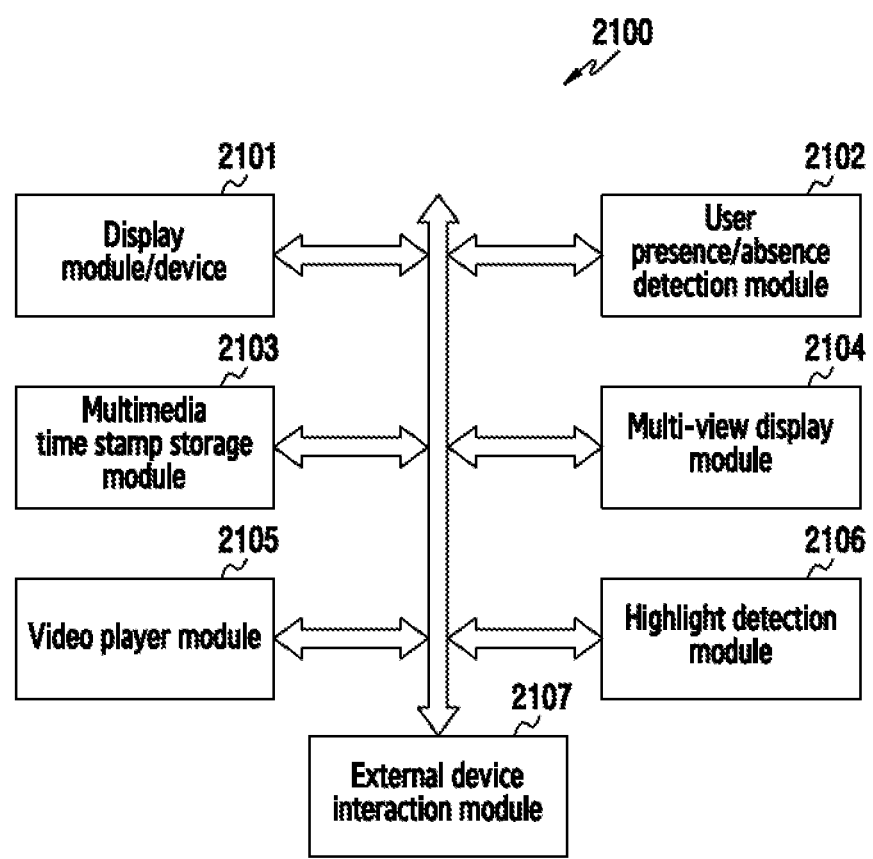
FIG. 21 illustrates an example of a functional configuration of an electronic device for displaying a content starting from a stored time stamp according to various embodiments of the present disclosure.

FIG. 21 illustrates an example of a functional configuration of an electronic device for displaying a content starting from a stored time stamp according to various embodiments of the present disclosure.

Referring to FIG. 21, the electronic device 2100 includes a display module/device 2101, a detection module 2102, a multimedia time stamp storage module 2103, a multi-view display module 2104, a video player module 2105, a highlight detection module 2106, and an external device interaction module 2107.

The display module/device 2101 displays a multimedia content for a plurality of users. The multimedia content may be a streaming content.

The detection module 2102 detects a condition related to non-viewing of the multimedia content displayed on the screen by a first user of the plurality of users. The detection module 2102 may be further configured to detect a condition related to a start of watching of the multimedia content displayed on the screen by the first user.

The multimedia time stamp storage module 2103 stores time stamp information on a part of the multimedia content corresponding to the content related to non-viewing of the multimedia content displayed on the screen by the first user. According to an embodiment, the multimedia content time stamp storage module 2103 may additionally store other time stamp information of another part of the displayed multimedia content corresponding to the condition related to non-viewing of the multimedia content displayed on the screen by the second user among the plurality of users.

According to the first user starting viewing the multimedia content displayed on the screen, the multi-view display module 2104 simultaneously provides the multimedia content for the plurality of users and a format of the multimedia content starting from the stored time stamp information in the presentation mode.

The video player module 2105 plays a part of the multimedia content starting from the stored time stamp information. The video player module 2105 may perform a general playback or a fast playback of the multimedia content starting from the stored time stamp information.

The highlight detection module 2106 detects highlights within the multimedia content starting from the stored time stamp information. The highlight detection module 2106 may detect highlights while the video player module 2105 plays the multimedia content starting from the stored time stamp information. According to an embodiment, the highlight detection module 2106 may provide a format of the highlight of the multimedia content or a summary of the multimedia content starting from the stored time stamp information while the video player module 2105 plays the multimedia content.

The external device interaction module 2107 interacts with another electronic device to play the part of the multimedia content starting from the stored time stamp information in the other electronic device or to provide the format of the highlight of the multimedia content or the summary of the multimedia content starting from the stored time stamp information.

According to an embodiment, when the part of the multimedia content starting from the stored time stamp information is played in the other electronic device or when the format of the highlight of the multimedia content or the summary of the multimedia content starting from the stored time stamp information is provided, the electronic device 2100 may not include the multi-view display module 2104 and the video player module 2105. According to another embodiment, the electronic device 2100 may not play back the part of the multimedia content in the highlight mode and the trick play mode.

Figure 22:
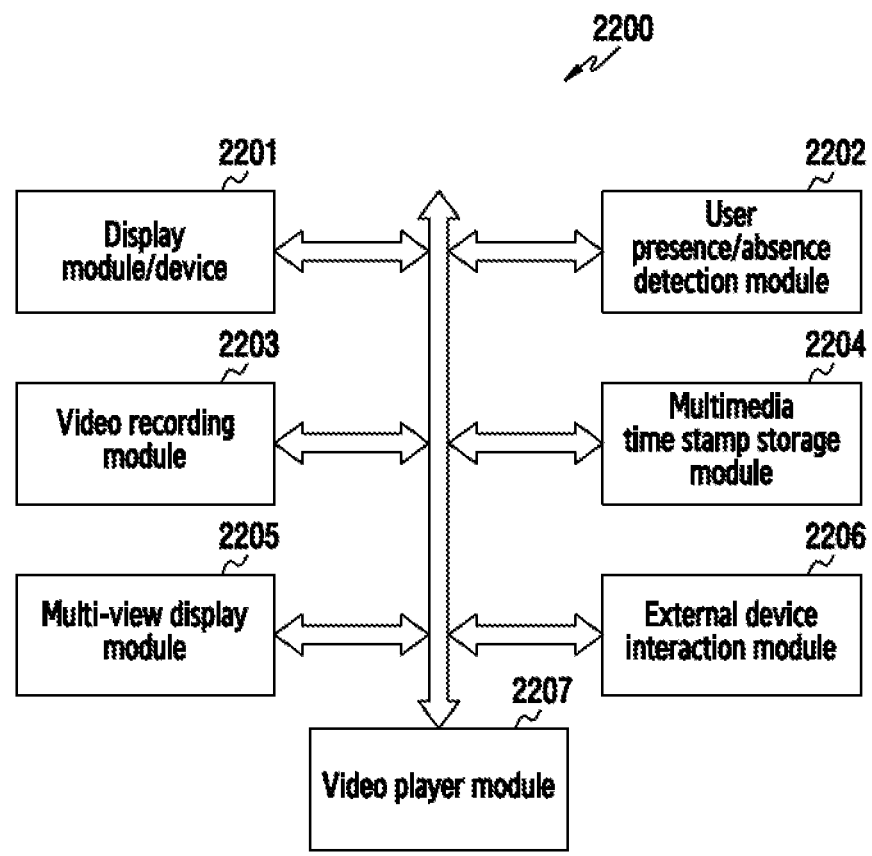
FIG. 22 illustrates an example of a functional configuration of an electronic device according to various embodiments of the present disclosure.

FIG. 22 illustrates an example of a functional configuration of an electronic device according to various embodiments of the present disclosure.

Referring to FIG. 22, the electronic device 2200 includes a display module/device 2201 and a detection module 2202. Further, the electronic device 2200 may include at least one of a video recording module 2203 and a multimedia time stamp storage module 2204. In addition, the electronic device 2200 may include at least one of a multi-view display module 2205 and an external device interaction module 2206. Moreover, the electronic device 2200 may include a video player module 2207 for playing a multimedia content.

Methods stated in the claims and/or specification according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:

displaying a multimedia content for a plurality of users;

detecting non-viewing of the multimedia content displayed on a screen by a first user among the plurality of users on a first time point of the displayed multimedia content;

recording a first part of the displayed multimedia content corresponding to the first time point;

detecting a start of viewing of multimedia content displayed on the screen by the first user on a second time point of the displayed multimedia content after the first time point; and displaying on the second time point, both of the first part of the multimedia content corresponding to the first time point in a first area on the screen and a second part of the multimedia content corresponding to the second time point in a second area on the screen.

2. The method of claim 1, further comprising:

detecting non-viewing of the multimedia content displayed on the screen by a second user among the plurality of users on a third time point of the displayed multimedia content;

recording a third part of the displayed multimedia content corresponding to the third time point;

detecting a start of viewing of the multimedia content displayed on the screen by the second user on a fourth time point of the displayed multimedia content after the third time point; and displaying on the fourth time point, both of the recorded third part of the multimedia content corresponding to the third time point in a third area on the screen and fourth part of the multimedia content corresponding to the fourth time point in a fourth area on the screen.

3. The method of claim 1, wherein the detecting of the non-viewing of the multimedia content displayed on the screen by the first user among the plurality of users comprises detecting that the first user does not exist within a detection area of the electronic device or detecting that a gaze of the first user does not face the electronic device.

4. The method of claim 1, wherein the detecting of the start of the viewing of the multimedia content displayed on the screen by the first user comprises detecting that the first user exists within a detection area of the electronic device or detecting that a gaze of the first user faces the electronic device.

5. The method of claim 1, wherein the first part is at least one of a highlight of the recorded first part and a summary of the recorded first part.

6. The method of claim 1, wherein the first part is a part of the multimedia content corresponding to a time interval from the first time point when the non-viewing of the multimedia content displayed on the screen by the first user is detected to the second time point when the start of the viewing of the multimedia content displayed on the screen by the first user is detected.

7. The method of claim 1, wherein the displaying of the multimedia content for the plurality of users and the first part of the multimedia content comprises displaying the multimedia content for the plurality of users and displaying the first part of the multimedia content corresponding to the first user in one of a full screen mode, a picture-in picture mode, a split screen mode, a multi-view mode, and an augmented mode.

8. The method of claim 1,
wherein the displaying of the multimedia content for the plurality of users and the first part of the multimedia content comprises:
displaying the multimedia content for the plurality of users; and
transmitting information on the first part of the multimedia content corresponding to the first user to another electronic device, and
wherein the first part of the multimedia content is displayed in the other electronic device.

9. The method of claim 1,
wherein the recording of the first part of the displayed multimedia content comprises storing time stamp information of the first part of the displayed multimedia content, and
wherein the time stamp information corresponds to information on a time point when the non-viewing of the multimedia content displayed on the screen by the first user is detected.

10. The method of claim 9, wherein the displaying of the multimedia content for the plurality of users and the first part of the multimedia content corresponding to the first user comprises displaying the multimedia content for the plurality of users and the first part of the multimedia content corresponding to the first user based on the stored time stamp information.

11. An electronic device comprising:
a display configured to display a multimedia content for a plurality of users;
a sensor configured to detect non-viewing of the multimedia content displayed on a screen by a first user among the plurality of users on a first time point of the displayed multimedia content; and
a memory configured to record a first part of the displayed multimedia content corresponding to the first time point,
wherein the sensor is further configured to detect a start of viewing of multimedia content displayed on the screen by the first user on a second time point of the displayed multimedia content after the first time point, and
wherein the display is further configured to display on the second time point, both of the first part of the multimedia content corresponding to the first time point in a first area on the screen and a second part of the multimedia content corresponding to the second time point in a second area on the screen.

12. The electronic device of claim 11,
wherein the sensor is further configured to detect non-viewing of the multimedia content displayed on the screen by a second user among the plurality of users on a third time point of the displayed multimedia content,
wherein the memory is further configured to record a third part of the displayed multimedia content corresponding to the third time point,
wherein the sensor is further configured to detect a start of viewing of the multimedia content displayed on the screen by the second user on a fourth time point of the displayed multimedia content after the third time point, and
wherein the display is further configured to display on the fourth time point, both of the recorded third part of the multimedia content corresponding to the third time point in a thrid area on the screen and fourth part of the multimedia content corresponding to the fourth time point in a fourth area on the screen.

13. The electronic device of claim 11, wherein the sensor is configured to detect that the first user does not exist within a detection area of the electronic device or detect that a gaze of the first user does not face the electronic device.

14. The electronic device of claim 11, wherein the sensor is configured to detect that the first user exists within a detection area of the electronic device or detect that a gaze of the first user faces the electronic device.

15. The electronic device of claim 11, wherein the first part is at least one of a highlight of the recorded first part and a summary of the recorded first part.

16. The electronic device of claim 11, wherein the first part is a part of the multimedia content corresponding to a time interval from the first time point when the non-viewing of the multimedia content displayed on the screen by the first user is detected to the second time point when the start of the viewing of the multimedia content displayed on the screen by the first user is detected.

17. The electronic device of claim 11, wherein the display is configured to display the multimedia content for the plurality of users and display the first part of the multimedia content corresponding to the first user in one of a full screen mode, a picture-in picture mode, a split screen mode, a multi-view mode, and an augmented mode.

18. The electronic device of claim 11, further comprising:
a transceiver,
wherein the display is configured to display the multimedia content for the plurality of users,
wherein the transceiver is configured to transmit information on the first part of the multimedia content corresponding to the first user to another electronic device, and
wherein the first part of the multimedia content is displayed in the other electronic device.

19. The electronic device of claim 11,
wherein the memory is configured to store time stamp information of the first part of the displayed multimedia content, and
wherein the time stamp information corresponds to information on a time point when the non-viewing of the multimedia content displayed on the screen by the first user is detected.

20. The electronic device of claim 19, wherein the display is configured to display the multimedia content for the plurality of users and the first part of the multimedia content corresponding to the first user based on the stored time stamp information.

* * * * *